US011212438B2

(12) United States Patent
Van der Auwera et al.

(10) Patent No.: US 11,212,438 B2
(45) Date of Patent: Dec. 28, 2021

(54) LOOP FILTER PADDING FOR 360-DEGREE VIDEO CODING

(71) Applicant: QUALCOMM Incorporated, San Diego, CA (US)

(72) Inventors: Geert Van der Auwera, Del Mar, CA (US); Muhammed Zeyd Coban, Carlsbad, CA (US); Fnu Hendry, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 140 days.

(21) Appl. No.: 16/270,275

(22) Filed: Feb. 7, 2019

(65) Prior Publication Data

US 2019/0253622 A1 Aug. 15, 2019

Related U.S. Application Data

(60) Provisional application No. 62/630,624, filed on Feb. 14, 2018.

(51) Int. Cl.
*H04N 19/597* (2014.01)
*H04N 19/82* (2014.01)
(Continued)

(52) U.S. Cl.
CPC ......... *H04N 5/23238* (2013.01); *H04N 19/46* (2014.11); *H04N 19/503* (2014.11);
(Continued)

(58) Field of Classification Search
CPC ...... H04N 19/167; H04N 19/33; H04N 19/46; H04N 19/503; H04N 19/597; H04N 19/82; H04N 19/86; H04N 5/23238
(Continued)

(56) References Cited

U.S. PATENT DOCUMENTS

2017/0085917 A1* 3/2017 Hannuksela ......... H04N 19/523
2018/0020202 A1* 1/2018 Xu ....................... H04N 13/106
(Continued)

OTHER PUBLICATIONS

Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v1, 40 pages.
(Continued)

*Primary Examiner* — Christopher S Kelley
*Assistant Examiner* — Kathleen M Walsh
(74) *Attorney, Agent, or Firm* — Shumaker & Sieffert, P.A.

(57) ABSTRACT

An example method includes, receiving an encoded picture of 360-degree video data, the encoded picture of 360-degree video data being arranged in packed faces obtained from a projection of a sphere of the 360-degree video data; decoding the picture of encoded 360-degree video data to obtain a reconstructed picture of 360-degree video data, the reconstructed picture of 360-degree video data being arranged in the packed faces; padding the reconstructed picture of 360-degree video data to generate a padded reconstructed picture of 360-degree video data; in-loop filtering the padded reconstructed picture of 360-degree video data to generate a padded and filtered reconstructed picture of 360-degree video data; and storing the padded and filtered reconstructed picture of 360-degree video data in a reference picture memory for use in predicting subsequent pictures of 360-degree video data.

24 Claims, 17 Drawing Sheets

Encoder Architecture with Padding Inserted Before Loop-filtering

(51) Int. Cl.
| | |
|---|---|
| *H04N 19/503* | (2014.01) |
| *H04N 19/86* | (2014.01) |
| *H04N 5/232* | (2006.01) |
| *H04N 19/46* | (2014.01) |
| *H04N 19/167* | (2014.01) |
| *H04N 19/33* | (2014.01) |

(52) U.S. Cl.
CPC ........... *H04N 19/597* (2014.11); *H04N 19/82* (2014.11); *H04N 19/86* (2014.11); *H04N 19/167* (2014.11); *H04N 19/33* (2014.11)

(58) Field of Classification Search
USPC ..................................................... 375/240.29
See application file for complete search history.

(56) References Cited

U.S. PATENT DOCUMENTS

| | | | |
|---|---|---|---|
| 2018/0098090 A1* | 4/2018 | Lin ..................... | H04N 19/70 |
| 2018/0192074 A1* | 7/2018 | Shih .................... | H04N 19/597 |
| 2018/0268516 A1 | 9/2018 | Coban et al. | |
| 2018/0268517 A1 | 9/2018 | Coban et al. | |
| 2018/0276789 A1 | 9/2018 | Van Der Auwera et al. | |
| 2018/0276826 A1 | 9/2018 | Van Der Auwera et al. | |
| 2019/0005683 A1 | 1/2019 | Van Der Auwera et al. | |
| 2019/0007683 A1 | 1/2019 | Van Der Auwera et al. | |
| 2019/0007684 A1 | 1/2019 | Van Der Auwera et al. | |
| 2019/0014347 A1 | 1/2019 | Hendry et al. | |
| 2019/0200023 A1* | 6/2019 | Hanhart ............... | H04N 19/184 |
| 2019/0215532 A1* | 7/2019 | He ....................... | H04N 13/117 |
| 2019/0253624 A1* | 8/2019 | Kim .................... | H04N 5/23238 |
| 2019/0268599 A1* | 8/2019 | Hannuksela .......... | G06T 3/0062 |
| 2019/0281217 A1* | 9/2019 | Kim .................... | H04N 19/119 |
| 2020/0120359 A1* | 4/2020 | Hanhart ............... | H04N 19/105 |
| 2020/0154139 A1* | 5/2020 | Hannuksela ........... | H04N 19/70 |

OTHER PUBLICATIONS

Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-V2, 10 pages.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 51 pp.

Chen Y W., et al., "Description of SDR, HDR and 360° Video Coding Technology Proposal by Qualcomm and Technicolor" "low and High Complexity Versions", 10. JVET Meeting, Oct. 4, 2018-Apr. 20, 2018, San Diego, (The Joint Video Exploration Team of ISO/IEC JTC1/SC29/WG11 and ITU-T SG.16 ), URL:http://phenix.int-evry.fr/jvet/ No.JVET-J0021-v5, Apr. 14, 2018 (Apr. 14, 2018), XP030151183, pp. 1-43, section 3: "360°"; p. 25-p. 26.

Hanhart P., et al., "InterDigital's Response to the 360° Video Category in Joint Call for Evidence on Video Compression with Capability beyond HEVC," 7 JVET Meeting, Torino, Joint Video Exploration Team of ISO/IEC JTC 1/SC29/WG11 and ITU-T SG 16, JVET-G0024, Jul. 6, 2017, pp. 1-16, XP030150821, URL: http://phenix.int-evry.fr/jvet/.

International Search Report and Written Opinion—PCT/US2019/017289—ISA/EPO—dated May 3, 2019.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.

Sauer J., et al., "Geometry Correction for Motion Compensation of Planar-Projected 360VR Video", 4th JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/ No. JVET-D0067, Oct. 5, 2016, pp. 1-11, XP030150300.

Van Der Auwera G., et al., "AHG8: ECP with Padding for 360-Degree Video", 7. JVET Meeting; Jul. 13, 2017-Jul. 21, 2017; Torino; (The Joint Video Exploration Team of ISO/IEC JTC1/SC29/WG11 and ITU-T SG.16); URL: http://phenix.int-evry.fr/jvet/, No. JVET-G0074-v2, Jul. 15, 2017 (Jul. 15, 2017), pp. 1-14, XP030150866, the whole document.

* cited by examiner

FIG. 2A    ERP frame
FIG. 2B    CMP 3x2 frame

FIG. 2C    ACP 3x2 frame
FIG. 2D    ECP 3x2 frame

FIG. 5A

| Left | Front | Right |
|------|-------|-------|
| Bottom | Back | Top |

FIG. 5B

| Left | Front | Right |
|------|-------|-------|
| Bottom | Back | Top |

FIG. 5C

| Left | Front | Right |
|------|-------|-------|
| Top | Back | Bottom |

Encoder Architecture with Padding Inserted After Loop-filtering

Encoder Architecture with Padding Inserted Before Loop-filtering

LOOP FILTER PADDING FOR 360-DEGREE VIDEO CODING

RELATED APPLICATIONS

This application claims priority to U.S. Provisional Application No. 62/630,624, filed Feb. 14, 2018, the entire content of which is incorporated by reference herein.

TECHNICAL FIELD

This disclosure relates to encoding and decoding video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, also referred to as High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

More recently, techniques for coding and transmitting 360-degree video, e.g., for virtual reality (VR) applications have been developed. As a result of recent developments in VR video technology, the video environment experienced by the user has become just as important as the subject of the videos themselves. Such VR video technology may use 360-degree video technology that involves real-time streaming of 360-degree video graphics to a VR head-mount display (HMD) and/or real-time streaming of 360-degree video from a 360-degree video camera or website to a real-time video display, such as a VR head-mount display (HMD). A VR HMD allows the user to experience action happening all around them by changing a viewing angle with a turn of the head. In order to create a 360-degree video, a special set of cameras may be used to record all 360-degrees of a scene simultaneously, or multiple views (e.g., video and/or computer-generated images) may be stitched together to form the image.

SUMMARY

In general, this disclosure is directed to techniques for encoding and decoding 360-degree video data. For instance, a video coder (e.g., a video encoder or a video decoder) may code (e.g., encode or decode) a picture of 360-degree video data arranged into packed faces (e.g., that are obtained from a projection of a sphere of the 360-degree video data). When the picture of 360-degree video data is viewed, a renderer may generate a viewport of the 360-degree video data that matches a viewer's head orientation. Depending on this orientation and the field of view, the viewport may include one or more boundaries between the packed faces (e.g., boundaries within the picture between adjacent or non-adjacent regions).

While arranging the picture of 360-degree video data into packed faces may provide various advantages, such as the ability to utilize video codecs generally designed for rectangular pictures of video data, such arrangement may present one or more technical problems. For instance, arranging the picture of 360-degree video data into packed faces results in visible artifacts within the rendered viewport at the picture boundaries and boundaries between adjacent and non-adjacent regions (e.g., visible seam artifacts). The artifacts may result from one or both of motion compensation or in-loop filtering.

In accordance with one or more techniques of this disclosure, a video coder may add padding to a picture during the decoding process. For instance, the video coder may add additional samples to a reconstructed picture before applying in-loop filtering. In this way, the video coder may mitigate distortion and coding efficiency issues resulting from deformation and discontinuities at the borders between packed faces. Accordingly, the disclosure describes examples of technical solutions with practical applications that improve the technical operations of video coding.

In one example, a method of decoding 360-degree video data includes: receiving an encoded picture of 360-degree video data, the encoded picture of 360-degree video data being arranged in packed faces obtained from a projection of a sphere of the 360-degree video data; decoding the picture of encoded 360-degree video data to obtain a reconstructed picture of 360-degree video data, the decoded picture of 360-degree video data being arranged in the packed faces; padding the reconstructed picture of 360-degree video data to generate a padded reconstructed picture of 360-degree video data; in-loop filtering the padded reconstructed picture of 360-degree video data to generate a padded and filtered reconstructed picture of 360-degree video data; and storing the padded and filtered reconstructed picture of 360-degree video data in a reference picture memory for use in predicting subsequent pictures of 360-degree video data.

In another example, a device for decoding 360-degree video data includes: a memory; one or more processors that are implemented in circuitry and configured to: obtain, from the coded video bitstream, an encoded picture of 360-degree video data, the encoded picture of 360-degree video data being arranged in packed faces obtained from a projection of a sphere of the 360-degree video data; decode the picture of encoded 360-degree video data to obtain a reconstructed picture of 360-degree video data, the decoded picture of 360-degree video data being arranged in the packed faces; pad the reconstructed picture of 360-degree video data to generate a padded reconstructed picture of 360-degree video data; in-loop filter the padded reconstructed picture of 360-degree video data to generate a padded and filtered reconstructed picture of 360-degree video data; and store, in the memory, the padded and filtered reconstructed picture of 360-degree video data for use in predicting subsequent pictures of 360-degree video data.

In another example, a device for decoding 360-degree video data includes means for receiving an encoded picture of 360-degree video data, the encoded picture of 360-degree video data being arranged in packed faces obtained from a projection of a sphere of the 360-degree video data; means for decoding the picture of encoded 360-degree video data to obtain a reconstructed picture of 360-degree video data, the decoded picture of 360-degree video data being arranged in the packed faces; means for padding the reconstructed picture of 360-degree video data to generate a padded reconstructed picture of 360-degree video data; means for in-loop filtering the padded reconstructed picture of 360-degree video data to generate a padded and filtered reconstructed picture of 360-degree video data; and means for storing the padded and filtered reconstructed picture of 360-degree video data in a reference picture memory for use in predicting subsequent pictures of 360-degree video data.

In another example, a computer-readable storage medium stores instructions that, when executed, cause one or more processors of a video decoder to obtain an encoded picture of 360-degree video data, the encoded picture of 360-degree video data being arranged in packed faces obtained from a projection of a sphere of the 360-degree video data; decode the picture of encoded 360-degree video data to obtain a reconstructed picture of 360-degree video data, the decoded picture of 360-degree video data being arranged in the packed faces; pad the reconstructed picture of 360-degree video data to generate a padded reconstructed picture of 360-degree video data; in-loop filter the padded reconstructed picture of 360-degree video data to generate a padded and filtered reconstructed picture of 360-degree video data; and store, in a reference picture memory, the padded and filtered reconstructed picture of 360-degree video data for use in predicting subsequent pictures of 360-degree video data.

In another example, a device for decoding 360-degree video data includes: a memory; one or more processors that are implemented in circuitry and configured to: obtain, from the coded video bitstream, an encoded picture of 360-degree video data, the encoded picture of 360-degree video data being arranged in packed faces obtained from a projection of a sphere of the 360-degree video data; decode the picture of encoded 360-degree video data to obtain a reconstructed picture of 360-degree video data, the decoded picture of 360-degree video data being arranged in the packed faces; identify one or more regions in a viewport of the decoded picture of the 360-degree video data that include seams between the packed faces; and apply a filter to the one or more identified regions.

In another example, a method of encoding 360-degree video data includes: obtaining a reconstructed picture of 360-degree video data, the reconstructed picture of 360-degree video data being arranged in packed faces obtained from a projection of a sphere of the 360-degree video data; padding the reconstructed picture of 360-degree video data to generate a padded reconstructed picture of 360-degree video data; in-loop filtering the padded reconstructed picture of 360-degree video data to generate a padded and filtered reconstructed picture of 360-degree video data; and storing the padded and filtered reconstructed picture of 360-degree video data in a reference picture memory for use in predicting subsequent pictures of 360-degree video data.

In another example, a device for encoding 360-degree video data, the method comprising: a memory; one or more processors that are implemented in circuitry and configured to: obtain a reconstructed picture of 360-degree video data, the reconstructed picture of 360-degree video data being arranged in packed faces obtained from a projection of a sphere of the 360-degree video data; pad the reconstructed picture of 360-degree video data to generate a padded reconstructed picture of 360-degree video data; in-loop filter the padded reconstructed picture of 360-degree video data to generate a padded and filtered reconstructed picture of 360-degree video data; and store, in the memory, the padded and filtered reconstructed picture of 360-degree video data for use in predicting subsequent pictures of 360-degree video data.

In another example, a device for encoding 360-degree video data includes means for obtaining a reconstructed picture of 360-degree video data, the reconstructed picture of 360-degree video data being arranged in packed faces obtained from a projection of a sphere of the 360-degree video data; means for padding the reconstructed picture of 360-degree video data to generate a padded reconstructed picture of 360-degree video data; means for in-loop filtering the padded reconstructed picture of 360-degree video data to generate a padded and filtered reconstructed picture of 360-degree video data; and means for storing the padded and filtered reconstructed picture of 360-degree video data in a reference picture memory for use in predicting subsequent pictures of 360-degree video data.

In another example, a computer-readable storage medium stores instructions that, when executed, cause one or more processors of a video encoder to obtain a reconstructed picture of 360-degree video data, the reconstructed picture of 360-degree video data being arranged in packed faces obtained from a projection of a sphere of the 360-degree video data; pad the reconstructed picture of 360-degree video data to generate a padded reconstructed picture of 360-degree video data; in-loop filter the padded reconstructed picture of 360-degree video data to generate a padded and filtered reconstructed picture of 360-degree video data; and store, in the memory, the padded and filtered reconstructed picture of 360-degree video data for use in predicting subsequent pictures of 360-degree video data The details of one or more examples are set forth in the accompanying drawings and the description below. Other features, objects, and advantages will be apparent from the description and drawings, and from the claims.

BRIEF DESCRIPTION OF DRAWINGS

FIGS. 2A-2D respectively illustrate example projections of a picture of the PoleVaulf sequence obtained with equirectangular projection (ERP), cubemap projection (CMP), adjusted cubemap projection (ACP), and equatorial cylindrical projection (ECP).

FIGS. 5A-5C illustrate various padding schemes for 3×2 packed CMP and ACP pictures, which are based on the cube geometry with six faces, in accordance with one or more techniques of this disclosure.

DETAILED DESCRIPTION

Figure 1:
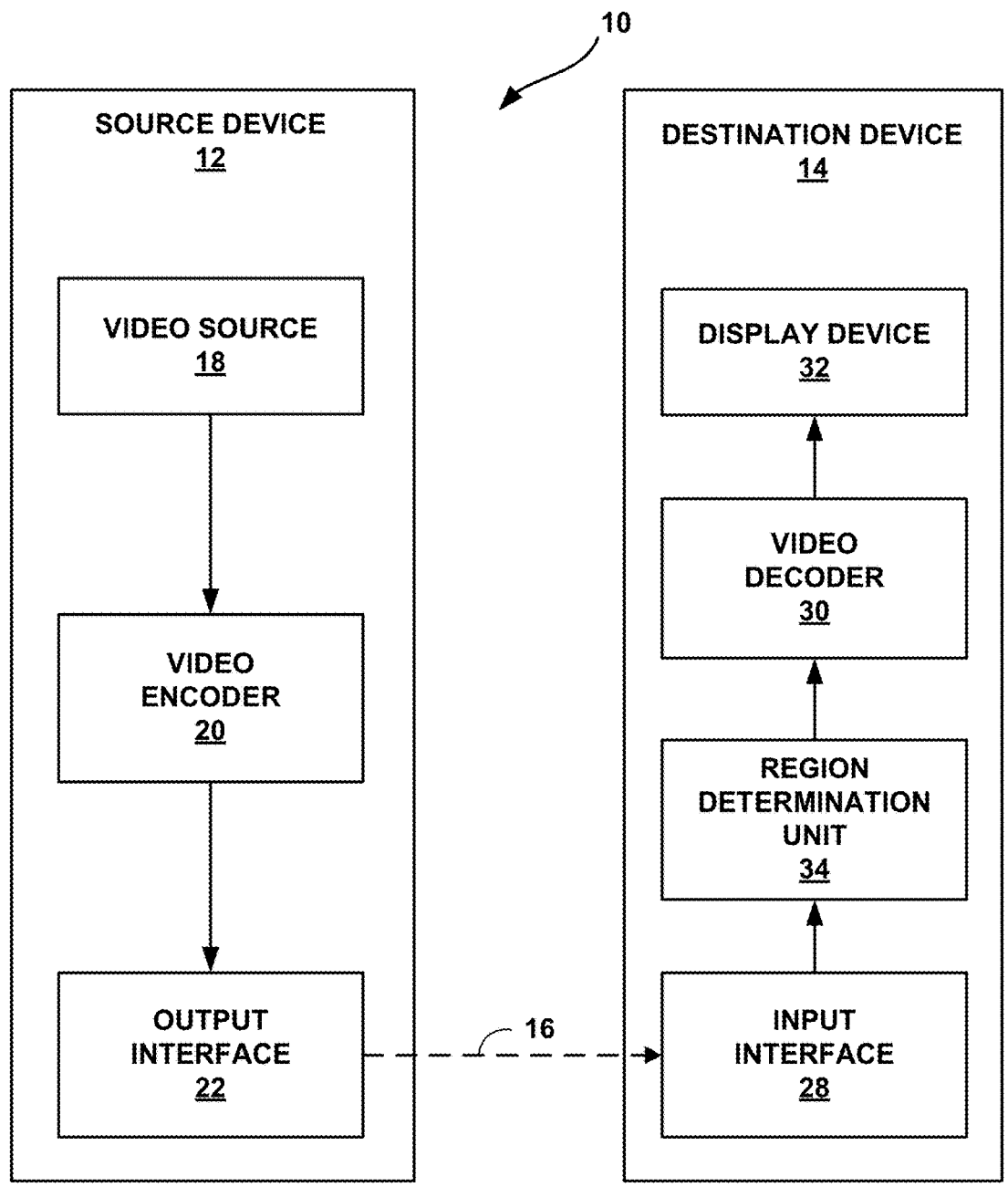
FIG. 1 is a block diagram illustrating an example video encoding and decoding system configured to perform the techniques of this disclosure.

FIG. 1 is a block diagram illustrating an example video encoding and decoding system 10 that may utilize techniques for padding of 360-degree video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, display device 32, and region determination unit 34. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for reference picture derivation and motion compensation may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

In examples of this disclosure, video source 18 may be configured to capture 360-degree video data. For example, video source 18 may be a camera set, which typically consists of multiple individual cameras pointing to different directions and ideally collectively covering all viewpoints around the camera set. Video source 18 may be further configured to perform image stitching where video and/or still pictures taken by the multiple individual cameras are synchronized in the time domain and stitched in the space domain, to be a spherical video or image, but mapped to a rectangular format, such as an equi-rectangular map (like a world map) or cube map.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, also referred to as ITU-T H.265. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP). In general, video decoder 30 performs a substantially similar, albeit reciprocal, process to that performed by video encoder 20 to decode encoded data.

Video encoder 20 and video decoder 30 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Video encoder 20 may further send syntax data, such as block-based syntax data, picture-based syntax data, and sequence-based syntax data, to video decoder 30, e.g., in a picture header, a block header, a slice header, or other syntax data, such as a sequence parameter set (SPS), picture parameter set (PPS), or video parameter set (VPS).

In accordance with the techniques of this disclosure, output interface 22 and input interface 28 may correspond to network interfaces, such as network interface cards (NICs) implementing one or more network protocols, such as Ethernet. Computer-readable medium 16 may correspond to a network connection, which may traverse a private or public network, such as the Internet.

Display device 32 may correspond to a panoramic display. For example, display device 32 may correspond to a head-mounted display (HMD) or one or more screens that substantially or fully envelop a user. Region determination unit 34 may be configured to determine a plurality of regions of display device 32. For example, display device 32 may include a plurality of tiles, e.g., one or more portions of cube faces corresponding to a spherical display (or display that can simulate a spherical display, such as an HMD).

As discussed herein, region determination unit 34 may determine one or more of the regions at which a visual focus of the user (not shown in FIG. 1) is directed. Region determination unit 34 may cause input interface 28 to retrieve video data for a first subset of regions of display device 32 at which a visual focus of a user is directed.

In some examples, source device 12 and destination device 14 may be configured to implement simultaneous multi-resolution (SMR) techniques. SMR is a new approach to partial decoding techniques. In accordance with SMR, independently coded, multiple resolution streams may be transferred, as compared to the scalable coding approach used in traditional partial decode schemes. SMR may allow for gradual quality drop off over a range of regions or tiles positioned progressively further away from the user's current viewpoint.

In one example, video encoder 20 may encode data for the full panorama at multiple resolutions, e.g., 6 k, 4 k, 8 k, HD (1080p), and 720p. That is, video encoder 20 may encode video data for each region (or "tile") at each of these multiple resolutions. In this manner, tile granularity may be the same for each resolution. Video encoder 20 may avoid inter-layer dependency when encoding the various resolutions. Thus, video decoder 30 may decode video data for the tiles at different resolutions in a selective manner (e.g., as selected by region determination unit 34). For example, region determination unit 34 may select a highest available resolution for region(s) at a center of the user's current viewpoint. Moving away from the center of the current viewpoint, the decoded resolution may drop gradually. That is, region determination unit 34 may select resolutions that get proportionally lower for regions (tiles) that are further from the center of the current viewpoint. Thus, video decoder 30 may decode video data at the lowest available resolution for tiles behind the user's current viewpoint.

As also noted above, video encoder 20, video decoder 30, and/or region determination unit 34 each may be implemented as any of a variety of suitable fixed and/or programmable circuitry, as applicable, such as one or more microprocessors, digital signal processors (DSPs), application specific integrated circuits (ASICs), field programmable gate arrays (FPGAs), discrete logic circuitry, software, hardware, firmware, or any combinations thereof. When functionality is implemented in software or firmware, instructions for the software or firmware are generally stored in a hardware-based computer-readable storage medium and executed by one or more processors, which again are implemented using logic circuitry. Each of video encoder 20 and video decoder 30 may be included in one or more encoders or decoders, either of which may be integrated as part of a combined video encoder/decoder (CODEC). A device including video encoder 20, video decoder 30, and/or region determination unit 34 may comprise an integrated circuit, a microprocessor, and/or a wireless communication device, such as a cellular telephone.

Destination device 14 may include a memory configured to store retrieved video data, such as a hard disk and/or a buffer. Such memory may be included within video decoder 30, region determination unit 34, or elsewhere within destination device 14.

The following describes various video coding techniques with reference to the HEVC standard. However, the techniques of this disclosure may be used with any video coding techniques used with 360-degree video data, including future video coding standards such as H.266 (also called Versatile Video Coding (VVC)).

In HEVC and other video coding specifications, a video sequence typically includes a series of pictures. Pictures may also be referred to as "frames." A picture may include three sample arrays, denoted SL, Scb, and Scr. SL is a two-dimensional array (i.e., a block) of luma samples. Scb is a two-dimensional array of Cb chrominance samples. Scr is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into 2 or 4 prediction units (PUs) or become just one PU when further partition does not apply. When two PUs are present in one CU, they can be half size rectangles or two rectangle size with ¼ or ¾ size of the CU.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU. When the CU is inter coded, one set of motion information may be present for each PU. In addition, each PU may be coded with a unique inter-prediction mode to derive the set of motion information.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RB SP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Projections and mappings may be used to represent three-dimensional (3D) surfaces on two-dimensional (2D) maps. For example, in 360-degree video applications, projections and mappings are used to map a 360-degree video represented on a sphere onto a two-dimensional video frame. Examples of projections and mappings include: equirectangular projection (ERP), cubemap projection (CMP), adjusted cubemap projection (ACP), and equatorial cylindrical projection (ECP). FIGS. 2A-2D respectively illustrate example projections of a picture of the PoleVaulf sequence obtained with ERP, CMP, ACP, and ECP projections.

In the ERP format, points on a sphere are mapped to a 2D map by linearly mapping the latitude and longitude of the points on the sphere to x-y coordinates on a picture. FIG. 2A illustrates an example picture of 360-degree video in the ERP format.

In the CMP format, the points on the surface of the sphere are projected to points on planes (faces of the cube) that are tangent to the sphere surface. The CMP projects the surface of the sphere onto planes (six faces of the cube) that are tangent to the sphere surface. FIG. 2B illustrates an example picture of 360-degree video in the CMP format.

The ACP format is an enhancement of the CMP format. In the ACP format, the sampling on the cube faces is adjusted to be nearly uniform. FIG. 2C illustrates an example picture of 360-degree video in the ACP format.

Besides the cube geometry, the cylindrical geometry has been utilized to achieve equal-area mapping of the sphere surface onto the projected picture. For instance, in the ECP format, an equatorial sphere segment is mapped onto a cylinder. In one example, the ECP format operates to project the equatorial region of the sphere between latitudes $\pm \sin^{-1}(\frac{2}{3}) \approx \pm 41.81°$ onto the cylinder geometry, while the circular sphere pole regions are warped into square regions in the projected picture. FIG. 2D illustrates an example picture of 360-degree video in the ECP format.

Various problems exist in the rendering of 360-degree video via known projections and mappings techniques that transform three-dimensional (3D) surfaces on two-dimensional (2D) maps. For example, seam artifacts resulting from the use of such techniques. The seam artifacts tend to appear when the projected picture consists of adjacent discontinuous regions or due to picture boundary.

After the projection process, the video pictures are compressed with a video encoder (AVC, HEVC, etc.), stored or transmitted, and decoded at the receiver side where the renderer generates the viewport that matches the viewer's head orientation. Depending on this orientation and the field of view, the viewport may cross the picture boundaries or boundaries within the picture between adjacent or non-adjacent regions.

FIGS. 3A-3E respectively illustrate examples of how the viewport may cross the picture boundaries or boundaries within the picture between adjacent or non-adjacent regions. The regions within the pictures that are required for rendering the viewport are represented by shaded rectangles (though the shape may or may not be rectangular). Additionally, the boundaries within the regions required for rendering are represented by bold line segments.

Figure 3A:
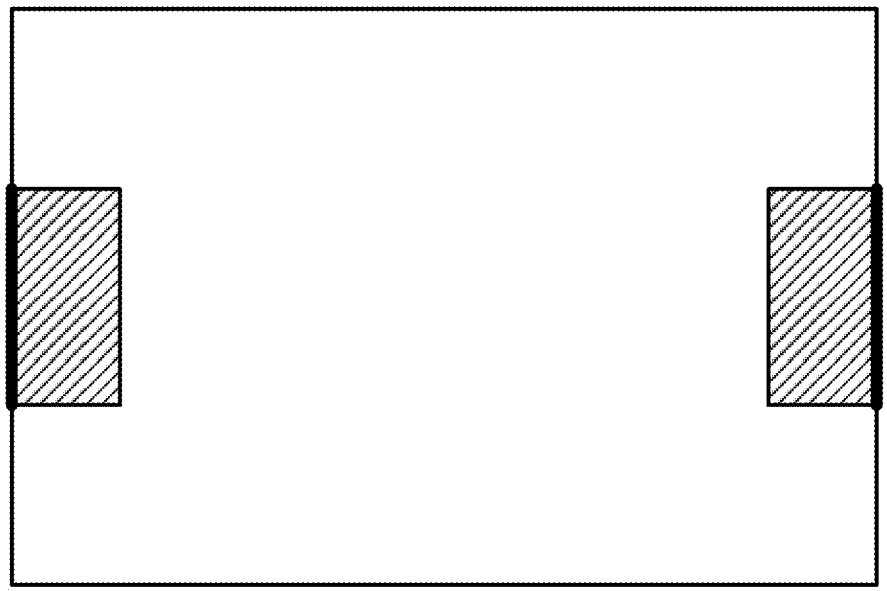
FIGS. 3A-3E respectively illustrate examples of how the viewport may cross the picture boundaries or boundaries within the picture between adjacent or non-adjacent regions.

In the ERP case, the left and right picture boundaries wrap around the back of the sphere, hence, a viewport that is orientated towards the back of the sphere may cross the left and right picture boundaries. An example of the viewport crossing the left and right picture boundaries in an ERP is illustrated in FIG. 3A.

Figure 3B:
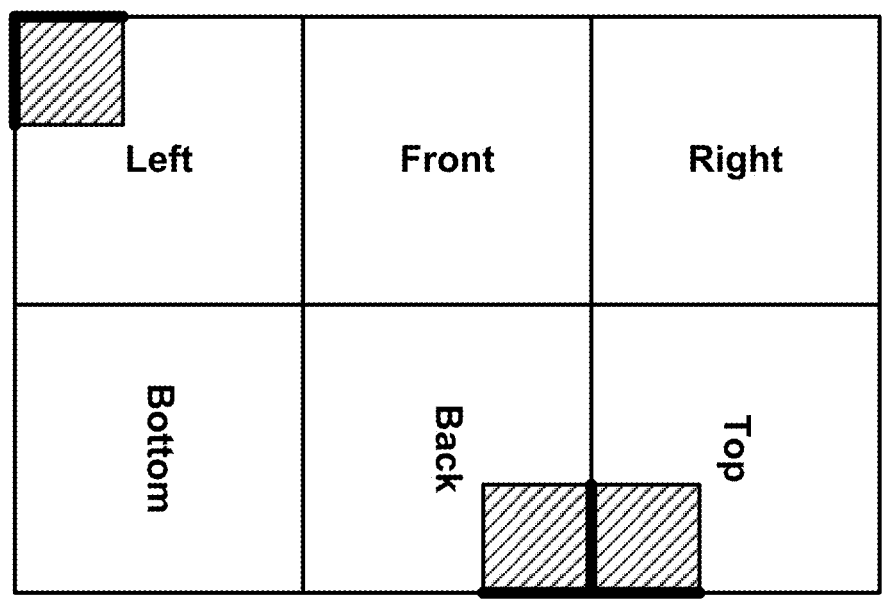
Figure 3C:
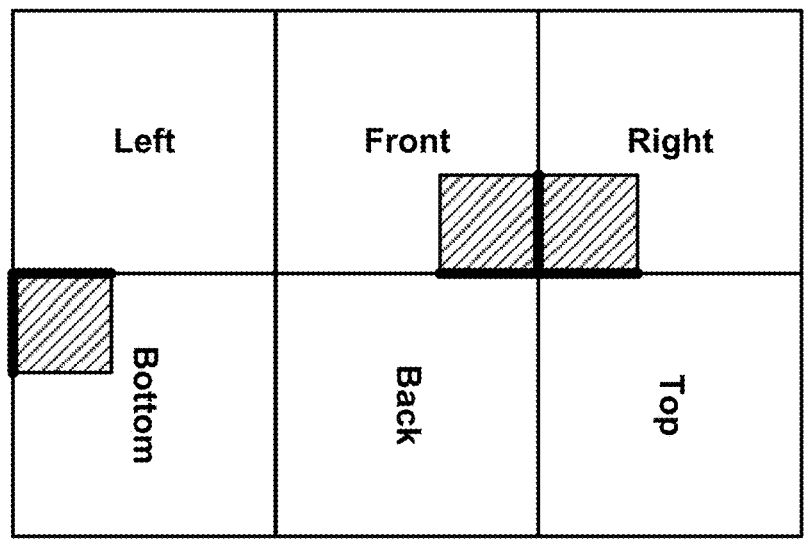

In case of 3×2 frame packing of the CMP or ACP cube faces as illustrated in FIGS. 2B and 2C, the viewport may cross various boundaries as depicted in FIGS. 3B and 3C. Although the left, front, and right cube faces are placed adjacent in the top picture half, there is still a boundary between the left and front faces, and between the front and right faces where, for example, lines are broken as is visible in FIGS. 2B and 2C, and similarly for the bottom picture half, where there is a boundary between the top and back faces, and between the bottom and back faces. These boundaries between adjacent cube faces are less discontinuous than the actual picture boundaries and the boundary between the top and bottom halves of the picture. FIGS. 3B and 3C illustrate two viewports with regions required for rendering that cross various boundaries. In these examples, a 3×2 packing of the cube faces is chosen, however, alternative packing schemes exist that have different boundaries. For example, the bottom picture half may have the faces in a different order such as top/back/bottom. The 3×2 packing has one of the fewest boundaries of the packing schemes.

Figure 3D:
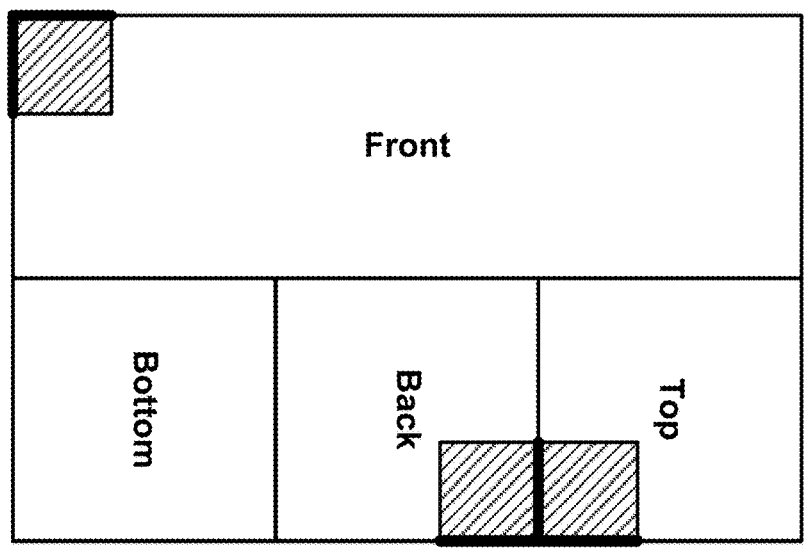
Figure 3E:
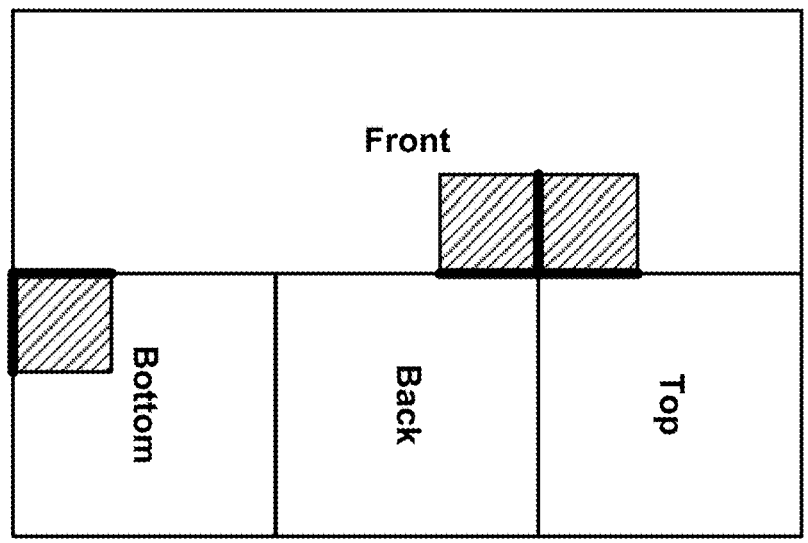

ECP boundaries are illustrated in FIGS. 3D and 3E with packing that is equivalent with the 3×2 packing of CMP and ACP. The main difference is that the top picture half is a continuous region corresponding with three quarters of the unwrapped cylinder which is used to project the equatorial region of the sphere. In this packing, one quarter of the unwrapped cylinder is placed in the back position. Compared with CMP and ACP, for example, lines are not broken at any boundary within the front region, however, lines are curved due to the cylindrical projection. Other boundaries are equivalent with CMP and ACP boundaries. Alternative packing schemes such as 6×1 or 1×6 keep the unwrapped cylinder region connected, however, additional boundaries are present between the cylindrical region and the pole regions.

The picture boundaries and boundaries between adjacent and non-adjacent regions within the picture may result in visible seam artifacts within the rendered viewport. Two potential causes of the seam artifacts are motion and in-loop filtering.

Figure 4A:
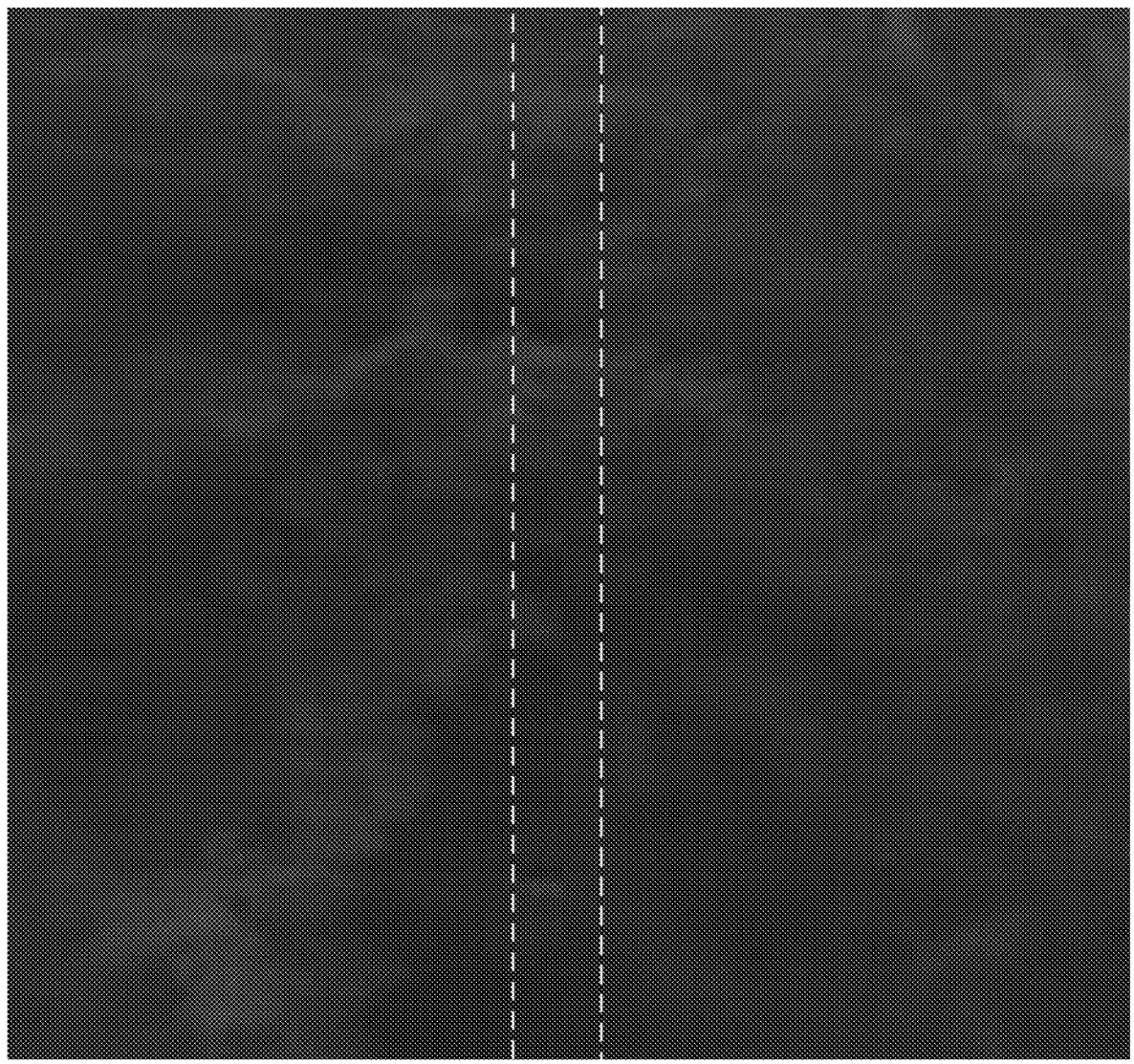
FIG. 4A illustrates an example of a rendered viewport seam due to motion.

Regarding motion as a potential cause, in the case of motion across the picture boundary directed into the region, the motion estimation process may select a block that partially includes the padded samples that the encoder adds to extend the reference pictures. At higher quantization parameter (QP) values, those padded samples appear on one side of the boundary in the viewport, while the other side of the boundary is different. FIG. 4A illustrates an example of a rendered viewport seam due to motion. In FIG. 4A, the seam artifact may be identified between the two dashed lines. This type of seam artifact may be strong (e.g., highly visible to a viewer of the rendered viewpoint) at higher QP values. A similar problem occurs, in some examples, inside the CMP or ACP picture (3×2 packing), when motion estimation selects a block that is located partially across the middle picture boundary.

Figure 4B:
FIG. 4B illustrates an example of a rendered viewport seam due to filtering.

Regarding in-loop filtering (e.g., deblocking, sample adaptive offset, and/or adaptive loop) as a potential cause, where filtering is disabled on the picture boundaries, a sharp, unfiltered seam may be visible in the rendered viewport especially at higher QP values. In the CMP or ACP picture (3×2 packing), the filtering may occur across the middle picture boundary resulting in visible (e.g., visible to a viewer of the rendered viewpoint) seam artifacts. FIG. 4B illustrates an example of a rendered viewport seam due to filtering. In FIG. 4B, the seam artifact may be identified between the two dashed lines.

Techniques are described herein that address the above-noted problems. In accordance with one or more techniques of this disclosure, a video coder (e.g., video encoder 20 or video decoder 30) may apply padding to a reconstructed picture of 360 video. This technique may be referred to as 360-padding. The video coder may apply the padding at any point after the picture of 360 video is reconstructed. As one example, the video coder may apply the 360-padding only once to the reconstructed picture and apply loop filters sequentially to the padded picture, which the video coder may store in a reference picture memory buffer without removing the padding. In such examples, the padded region may serve to (1) reduce the rendered seam artifacts and (2) improve the prediction efficiency in the motion estimation and compensation processes. As another example, the video coder may apply the 360-padding before each loop filter and remove the 360-padding after each loop filter, except for the last loop filter. After the last loop filter, the video coder may store the filtered padded picture into the reference picture memory. The first example (applying 360-padding before applying the loop filters) may have lower complexity than the second example.

In some examples, the samples in the padded regions may be additional projected samples, i.e., samples obtained around the projected regions with the same projection process, for example, the CMP, ACP, or ECP processes. There are other options for padded samples such as gradient samples that transition from one region to a second region in the projected picture, or duplicated samples where the boundary samples of the projected region are duplicated into the padded region. In general, the video coder may obtain the padded samples such that the compression efficiency is preserved while the seam artifacts are reduced.

The padded regions may be defined by a width and a location around the projected region in the picture. For example, the padded regions may be present along all sides of a cube face, which may be referred to as the symmetric case, or the padded regions may be placed along some sides that contribute most to the artifact reduction in the viewport, which may be referred to as the asymmetric case.

FIGS. 5A-5C illustrate various padding schemes for 3×2 packed CMP and ACP pictures, which are based on the cube geometry with six faces, in accordance with one or more techniques of this disclosure. In FIG. 5A, every cube face side has padding along top, bottom, left, and right. In FIG.

5B, there is padding around the top and bottom 3×1 picture halves. In FIG. 5C, there is an alternative packing for 3×2 CMP or ACP.

In FIGS. 5A and 5C, there is padding along every cube face side (region outside of dashed lines) so that the cube face region remains square. This is the symmetric padding case. In general, the padded region width may vary depending on the cube face side, which is the asymmetric padding case depicted FIG. 5B. FIG. 5B illustrates the case where the padded regions are added along the top and bottom 3×1 halves of the projected picture. This may be advantageous because the cube faces within the top and bottom halves are adjacent to avoid discontinuous edges. The assumption to support this type of regions is that the seam artifacts corresponding with the adjacent cube face edges are less visible in the rendered viewport and, hence, may not need padding.

Figure 6B:
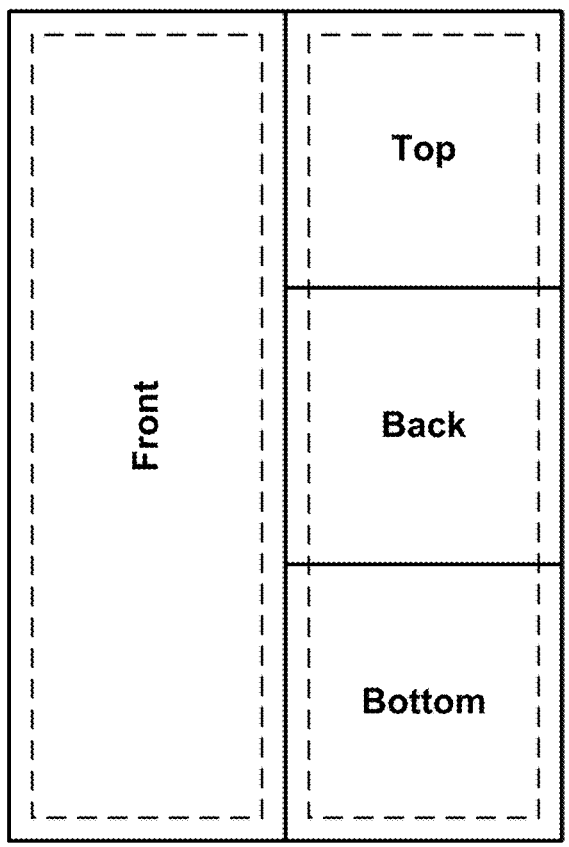
FIGS. 6A-6C illustrate padded regions for ECP pictures.
Figure 6A:
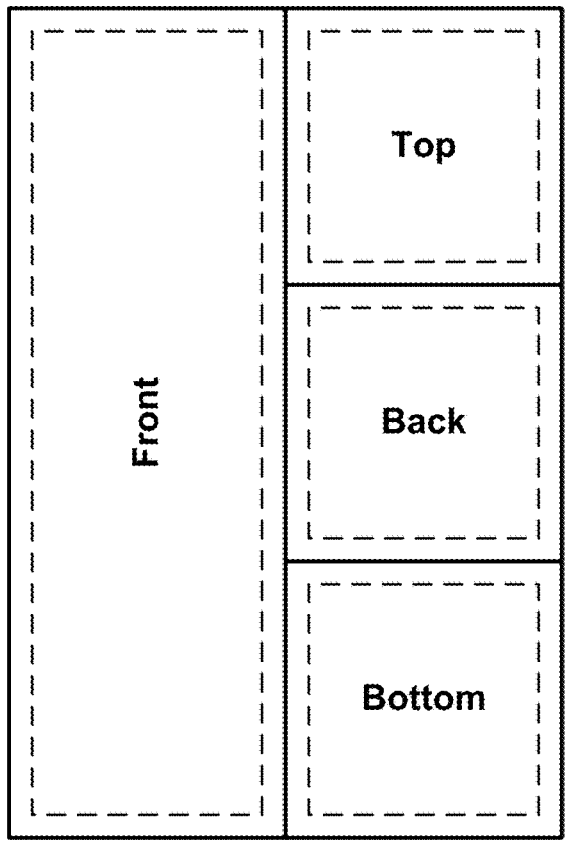
Figure 6C:
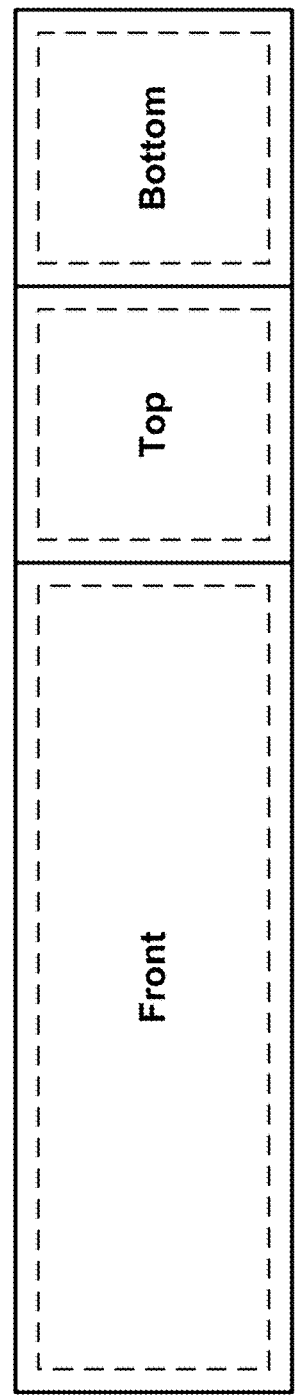

FIGS. 6A-6C illustrate padded regions for ECP pictures. FIG. 6A illustrates padding around top picture half and around top, bottom, and back regions, in accordance with one or more techniques of this disclosure. FIG. 6B illustrates padding around the top and bottom 3×1 picture halves. FIG. 6C illustrates 6×1 packed ECP with padded regions.

In 3×2 ECP packing, as compared to padding for the cube geometry, there is one cylinder region that is split into one front region and one back region. FIG. 6A depicts the symmetric padded region case, while FIG. 6B depicts the asymmetric case. Alternatively, ECP may be packed 1×6 or 6×1 as depicted in FIG. 6C where the cylinder region is not split. Depending on the packing type, the number of padded regions may be different. For example, (b) has 16 regions (one region counted per face side) while (d) has 18 regions. Hence, for similar protection, the 3×2 packing type may be more favorable in this case.

The video coder may signal usage of padded regions and their width, for example, in the file format, SEI messages, etc. As one example, a video encoder may encode, and a video decoder may decode, one or more syntax elements that specify whether 360-padding is used and any features of the padding (e.g., width).

Figure 7:
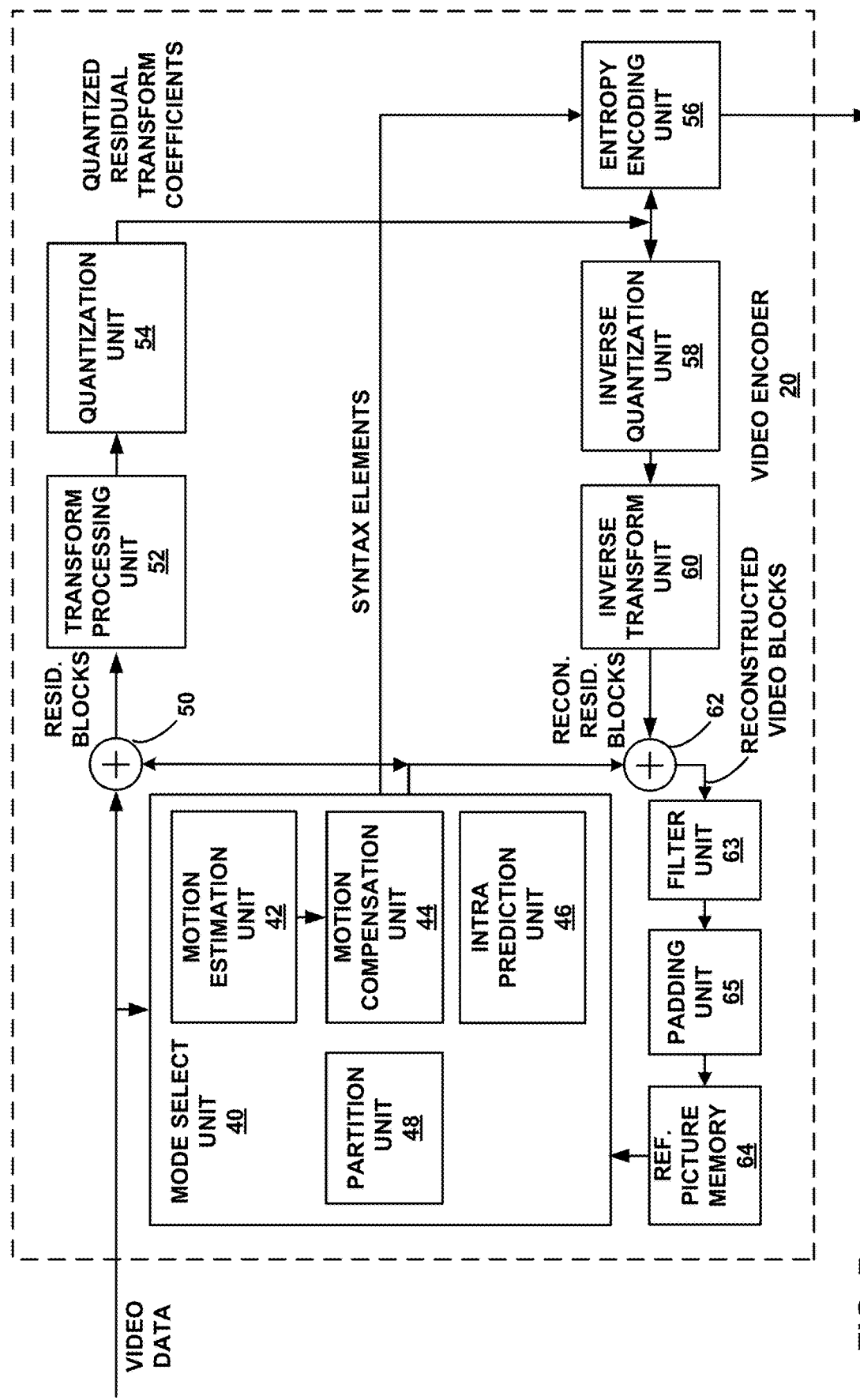
FIG. 7 is a block diagram illustrating an example video encoder configured to perform the techniques of this disclosure.

FIG. 7 is a block diagram illustrating an example of video encoder 20 that may implement techniques of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

The various units of FIG. 7 are illustrated to assist with understanding the operations performed by video encoder 20. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 20 may include arithmetic logic units (ALUs), elementary function units (EFUs), digital circuits, analog circuits, and/or programmable cores, formed from programmable circuits. In examples where the operations of video encoder 20 are performed using software executed by the programmable circuits, a memory may store the object code of the software that video encoder 20 receives and executes, or another memory within video encoder 20 may store such instructions.

As shown in FIG. 7, video encoder 20 receives a current video block within a video frame to be encoded. In the example of FIG. 7, video encoder 20 includes mode select unit 40, reference picture memory 64 (which may also be referred to as a decoded picture buffer (DPB)), summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. Video encoder 20 also includes filter unit 63 that may perform one or more types of filtering (e.g., in-loop filtering). Further details of one example of filter unit 63 are discussed below with reference to FIG. 12.

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively intra-predict the received video block using pixels of one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Furthermore, motion compensation unit 44 may be configured to perform any or all of the techniques of this disclosure (alone or in any combination). Although discussed with respect to motion compensation unit 44, it should be understood that mode select unit 40, motion estimation unit 42, partition unit 48, and/or entropy encoding unit 56 may also be configured to perform certain techniques of this disclosure, alone or in combination with motion compensation unit 44.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

Figure 8:
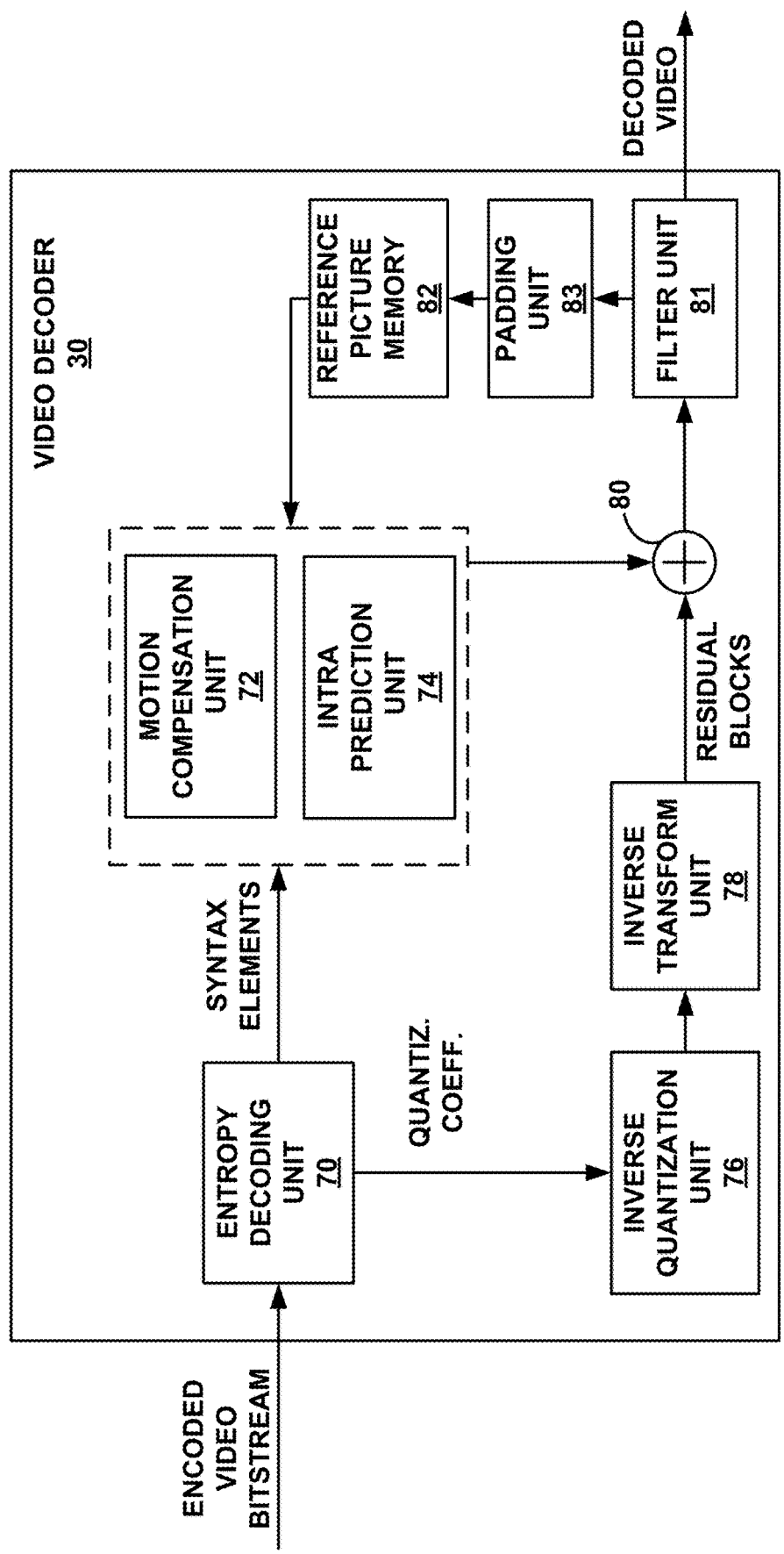
FIG. 8 is a block diagram illustrating an example video decoder configured to perform the techniques of this disclosure.

FIG. 8 is a block diagram illustrating an example of video decoder 30 that may implement techniques of this disclosure. In the example of FIG. 8, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 7). Motion compensation unit 72 may generate prediction data based on motion vectors received from entropy decoding unit 70, while intra-prediction unit 74 may generate prediction data based on intra-prediction mode indicators received from entropy decoding unit 70.

The various units of FIG. 8 are illustrated to assist with understanding the operations performed by video decoder 30. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 30 may include arithmetic logic units (ALUs), elementary function units (EFUs), digital circuits, analog circuits, and/or programmable cores, formed from programmable circuits. In examples where the operations of video decoder 30 are performed using software executed by the programmable circuits, a memory may store the object code of the software that video decoder 30 receives and executes, or another memory within video decoder 30 may store such instructions.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters for sub-pixel precision. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Furthermore, motion compensation unit 72 may be configured to perform any or all of the techniques of this disclosure (alone or in any combination). For example, motion compensation unit 72 may be configured to perform the BIO techniques discussed herein.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation.

After summer 80 reconstructs the decoded video block or picture, filter unit 81 may perform one or more filtering activities (e.g., in-loop filtering) to generate a filtered reconstructed block or picture. Further details of one example of filter unit 81 are discussed below with reference to FIG. 12.

The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1. For example, reference picture memory 82 may store decoded pictures.

In accordance with one or more techniques of this disclosure, video encoder 20 and video decoder 30 may include a padding unit configured to apply padding to pictures of 360 video. For instance, video encoder 20 may include padding unit 65 and video decoder 30 may include padding unit 83.

As discussed above, the 360 padding may be applied before or after loop filtering. For example, as shown in FIG. 7, padding unit 65 may be positioned after filter unit 63 and before reference picture memory 64. In the architecture of FIG. 7, the motion estimation and compensation processes can more efficiently predict blocks from the padded regions compared with traditional padding, such as sample duplication around the picture boundary. FIG. 8 illustrates the corresponding decoder architecture. In particular, as shown in FIG. 8, padding unit 83 may be positioned after filter unit 81 and before reference picture memory 82. In both FIG. 7 and FIG. 8, the respective filter units (i.e., filter unit 63 and filter unit 81) may contain loop filters such as a deblocking filter, a Sample Adaptive Offset (SAO) filter, and/or an Adaptive Loop Filter (ALF) that filter the reconstructed blocks or pictures to generate filtered reconstructed blocks or pictures. Each of these filters may require some form of padding, for example, sample duplication around the picture boundary, which may be removed before the 360-padding is applied to the filtered reconstructed picture.

Figure 9:
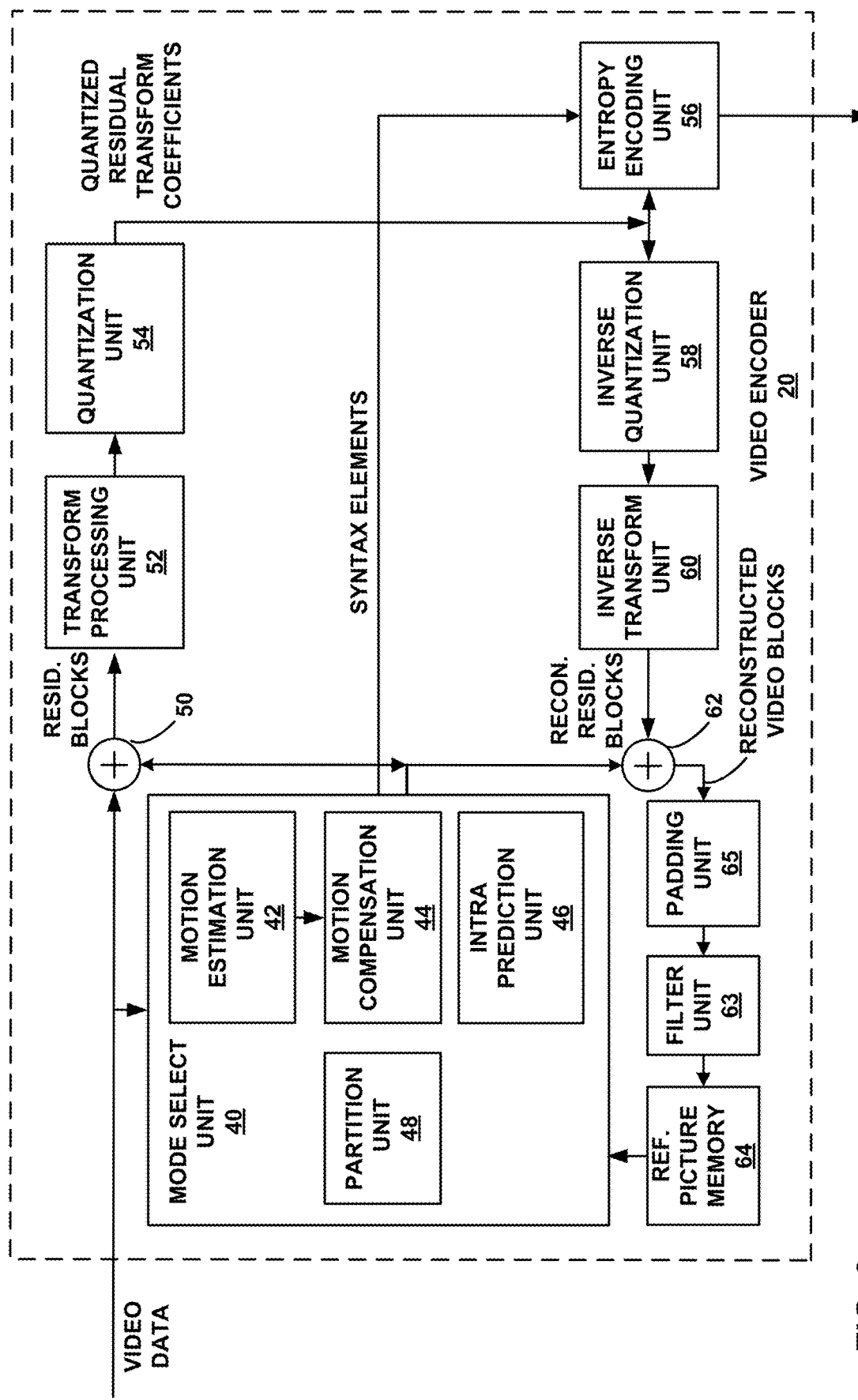
FIG. 9 is a block diagram illustrating an example video encoder configured to perform the techniques of this disclosure.
Figure 10:
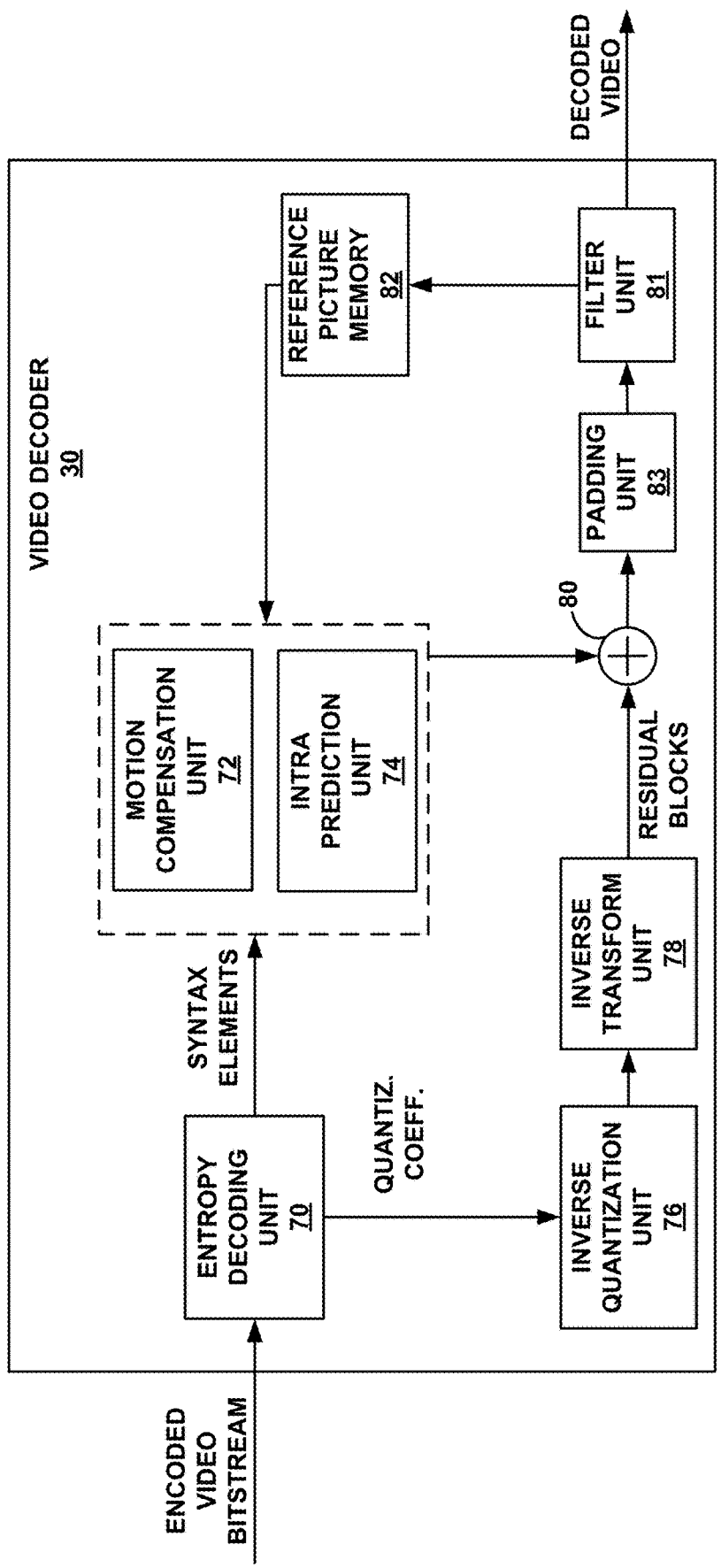
FIG. 10 is a block diagram illustrating an example video decoder configured to perform the techniques of this disclosure.

Since padding may be needed for the loop filters, in some examples it may be more efficient to apply the 360-padding once to the reconstructed picture before sequentially applying the loop filters and storing the padded and filtered reconstructed picture into the reference picture memory. For example, as shown in FIG. 9, padding unit 65 may be positioned before filter unit 63. FIG. 10 illustrates the corresponding decoder architecture. In particular, as shown in FIG. 10, padding unit 83 may be positioned before filter unit 81.

Figure 11:
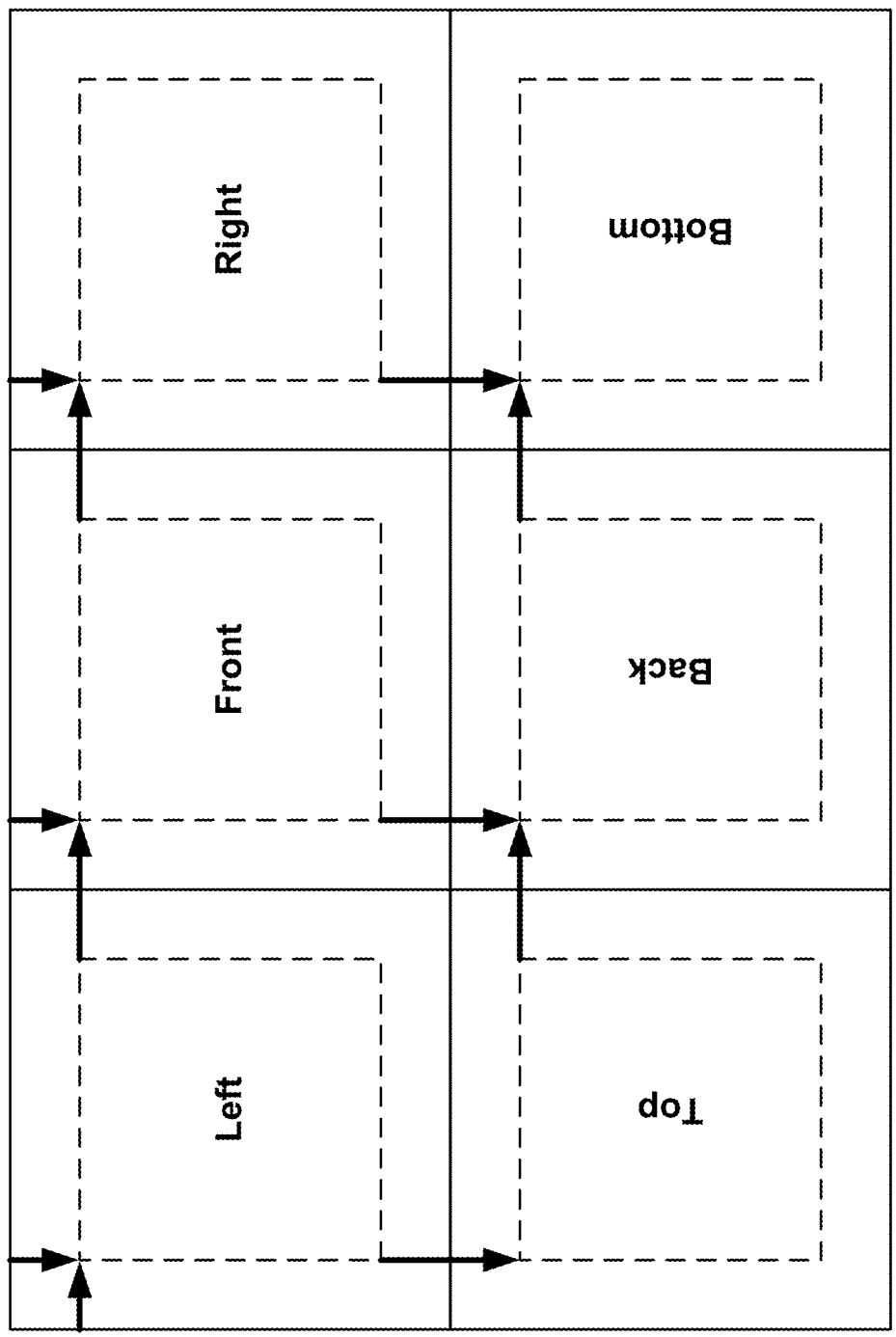
FIG. 11 illustrates an example of applying an offset to the filtering of each cube face within the 360-padded picture, in accordance with one or more techniques of this disclosure.

The latter architecture may require adaptations of the loop filters to consider the various padded regions, for example, around the cube faces of ACP. U.S. patent application Ser. No. 16/026,350, filed on Jul. 3, 2018 and published as US-2019-0014347-A1, describes adaptation of the deblocking loop filter for appropriately filtering 360-degree video pictures. Similarly, the SAO and ALF loop filters need adaptations so that they only filter the cube face areas, including the boundaries of each cube face. One adaptation consists of applying an offset to the filtering of each cube face within the 360-padded picture. FIG. 11 illustrates an example of applying an offset to the filtering of each cube face within the 360-padded picture, in accordance with one or more techniques of this disclosure. One goal may be to restrict the filtering to the cube faces and the four cube face sides, while the filtering uses the 360-padded samples if needed. In this way, video encoder 20 and or video decoder 30 may reduce the seam artifacts in the rendered viewports.

Figure 12:
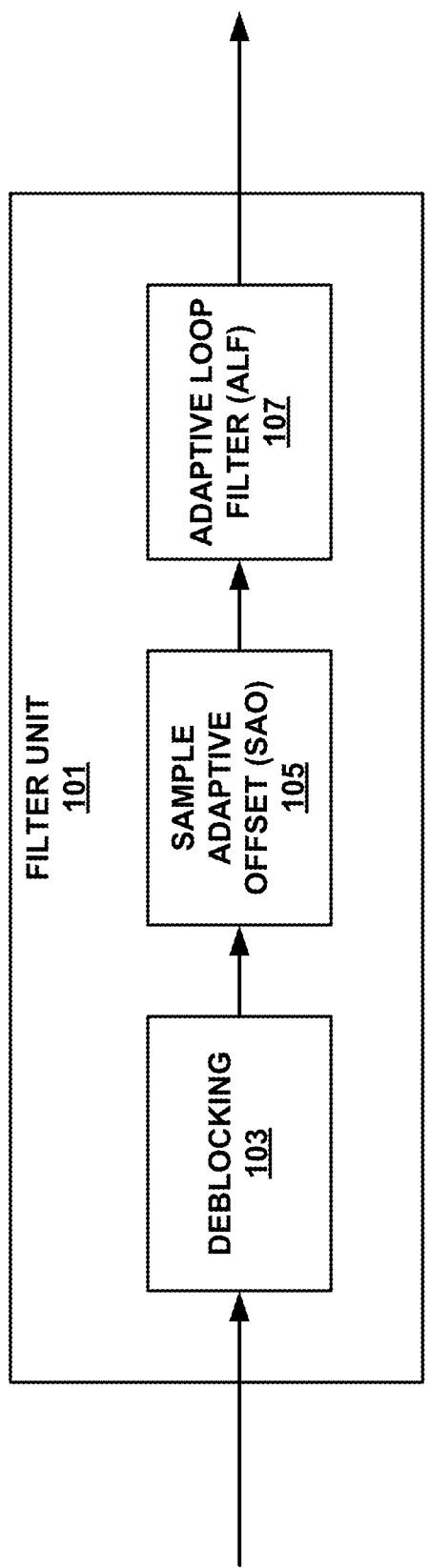
FIG. 12 is a block diagram illustrating an example of a filter unit that may implement techniques of this disclosure.

FIG. 12 is a block diagram illustrating an example of a filter unit that may implement techniques of this disclosure. Filter unit 101 may be considered to be an example of filter unit 63 of video encoder 20 or filter unit 81 of video decoder 30. As shown in FIG. 12, filter unit 101 may include deblocking filter 103 configured to filter block boundaries to remove blockiness artifacts from reconstructed video, sample adaptive offset (SAO) filter 105, and adaptive loop filter 107. In other examples, filter unit 101 may include fewer or more filters than shown in FIG. 12.

As an alternative to applying the 360-padding in the video codec loop, U.S. Provisional Application No. 62/526,700 filed on Jun. 29, 2017, describes reducing seam artifacts by applying padding to the video pictures before the video encoder, for example, as part of the projection process from ERP to CMP, ACP or ECP. This approach may reduce the seam artifacts for 360-degree video sequences with low motion content, while for high motion content the relatively narrow padding (e.g., with a width of eight samples) may be insufficiently wide to reduce the seam artifacts.

The 360-padding proposed in the present disclosure may be wider. For example, a width of the padding added may be greater than 8 samples. For instance, the width of the padding added in accordance with the current disclosure may be 32, 64, 128 or more samples. Therefore, the seam artifacts may be more effectively reduced (e.g., in the high motion cases). Nevertheless, for extremely large motion in the 360-degree video pictures, some seam artifacts may appear. Therefore, in accordance with one or more techniques of the present disclosure, a postprocessing unit may apply additional filtering. The postprocessing unit may be included in the various video codec architectures described above. For instance, a postprocessing unit or postprocessing device may apply additional filtering to the output of video encoder 20 or the output of video decoder 30. This postprocessing filtering can be applied to both padding approaches or without any padding.

One example of the postprocessing filtering may consist of applying a lowpass filter to the area of the rendered viewport where the seam artifacts are located to smooth the transition. In another example, corresponding padded regions can be mixed together or 'blended', for example, by applying weighting depending on the distance from the cube face boundary.

Figure 13:
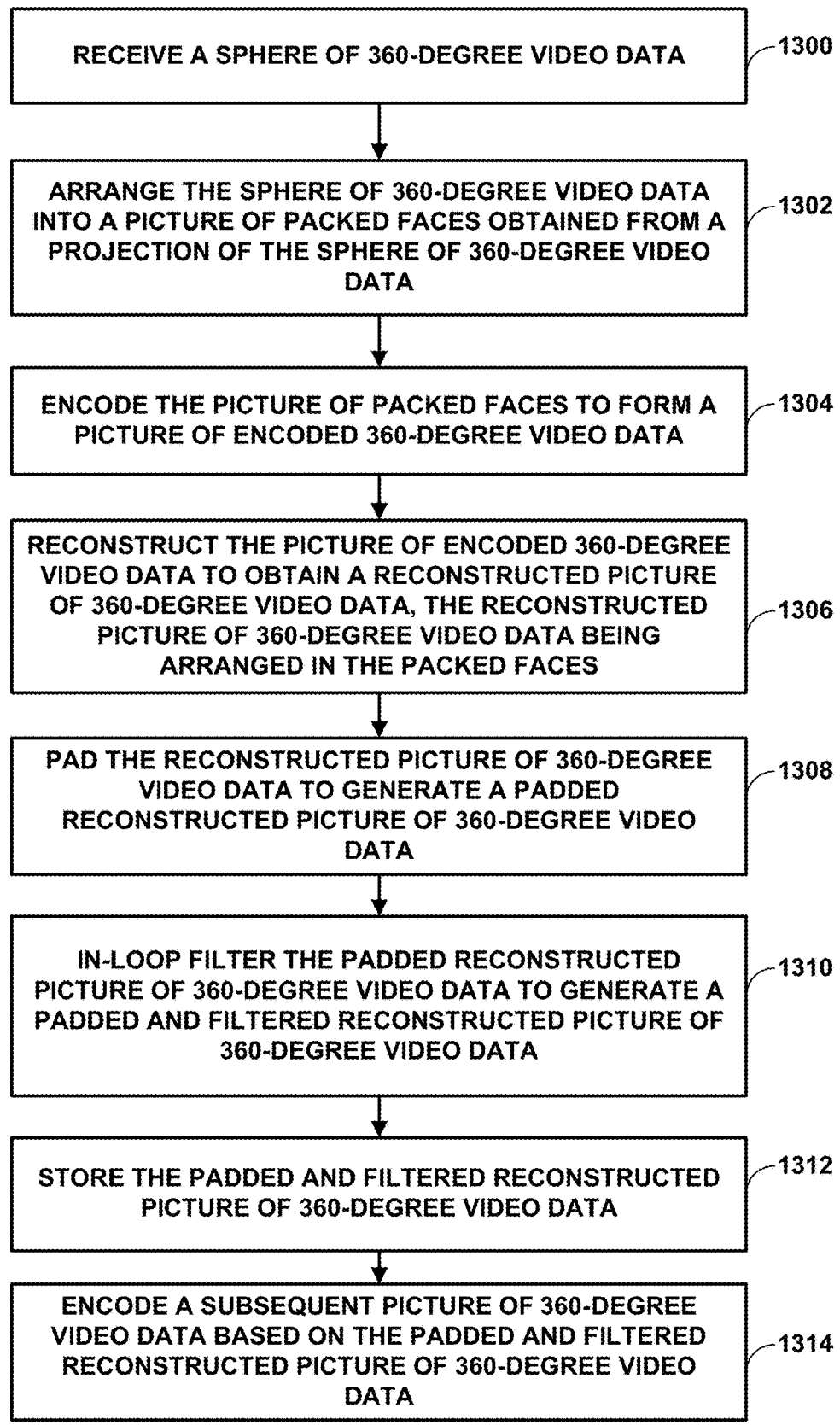
FIG. 13 is a flowchart illustrating an example encoding method of the disclosure.

FIG. 13 is a flowchart illustrating an example encoding method of the disclosure. Video encoder 20, including padding unit 65, may be configured to perform the techniques of FIG. 13.

In one example of the disclosure, video encoder 20 may be configured to receive the sphere of 360-degree video data (1300), and arrange the sphere of 360-degree video data into a picture of packed faces obtained from a projection of the sphere of 360-degree video data (1302). For instance, video encoder 20 may be configured to arrange the sphere of 360-degree video data into a picture of packed faces using any of equirectangular projection (ERP), cubemap projection (CMP), adjusted cubemap projection (ACP), equatorial cylindrical projection (ECP), or any other projection technique. As one example, video encoder 20 may arrange the sphere of 360-degree video data into the picture of packed faces as shown in any of FIGS. 2A-2D.

Video encoder 20 may be further configured to encode the picture of packed faces (1304). For instance, motion compensation unit 44 may generate prediction blocks for blocks of the picture of packed faces, summer 50 may calculate residual blocks for the blocks of the picture, and transform processing unit 52 and quantization unit 54 may respectively transform and quantize coefficients of the residual blocks.

Video encoder 20 may reconstruct the picture of encoded 360-degree video data to obtain a reconstructed picture of 360-degree video data, the reconstructed picture of 360-degree video data being arranged in the packed faces (1306). For instance, inverse quantization unit 58 and inverse transform unit 60 may respectively inverse quantize and inverse transform the quantized coefficients of the residual blocks to generate reconstructed residual blocks, and summer 62 may add the reconstructed residual blocks to corresponding motion compensated prediction blocks produced by motion compensation unit 44 or intra-prediction unit 46 to produce reconstructed video blocks.

Video encoder 20 may pad the reconstructed picture of 360-degree video data to generate a padded reconstructed picture of 360-degree video data (1308). For instance, padding unit 65 may add additional samples around a projected region (e.g., the packed faces) of the reconstructed picture of 360-degree video data as shown in the examples of FIGS. 5A-5C and 6A-6C.

In some examples, to add the additional samples, padding unit 65 may add the additional samples symmetrically around the packed faces. For instance, in the example of FIGS. 5A, 5C, 6A, and 6C, padding unit 65 may add samples around every face (region outside of dashed lines).

In some examples, to add the additional samples, padding unit 65 may add the additional samples asymmetrically around the packed faces. For instance, in the example of FIGS. 5B and 6B, padding unit 65 may add samples around every face (region outside of dashed lines).

Padding unit 65 may obtain the additional samples in a variety of ways. As one example, padding unit 65 may duplicate boundary samples of the projection region into the padded region. As another example, padding unit 65 may perform a projection process to convert the packed faces into a sphere of 360-degree video data, and obtain the additional samples from the sphere.

Video encoder 20 may in-loop filter the padded reconstructed picture of 360-degree video data (1310), and store the padded and filtered reconstructed picture of 360-degree video data (1312). For instance, filter unit 63 may apply any combination of filters, such as deblocking, SAO, and ALF, to the padded reconstructed picture of 360-degree video data to generate a padded and filtered reconstructed picture of 360-degree video data. Filter unit 63 may store the padded and filtered reconstructed picture of 360-degree video data in reference picture memory 64. In this way, the video encoder 20 may mitigate distortion and coding efficiency issues resulting from deformation and discontinuities at the borders between packed faces.

In some examples, filter unit 63 may filter samples of the padded reconstructed picture of 360-degree video data that are included in the packed faces based on samples of the padded reconstructed picture of 360-degree video data that are included in the packed faces and the added additional samples of the padded reconstructed picture of 360-degree video data. In some of such examples, filter unit 63 may not filter the added additional samples of the padded reconstructed picture of 360-degree video data. In this way, filter unit 63 may restrict the filtering to the packed faces (e.g., the cube faces).

Video encoder 20 may encode a subsequent picture of 360-degree video data based on the padded and filtered reconstructed picture of 360-degree video data (1314). For instance, motion estimation unit 42 and/or motion compensation unit 44 may utilize one or more blocks of the padded and filtered reconstructed picture of 360-degree video data as predictor blocks for performing inter prediction.

Figure 14:
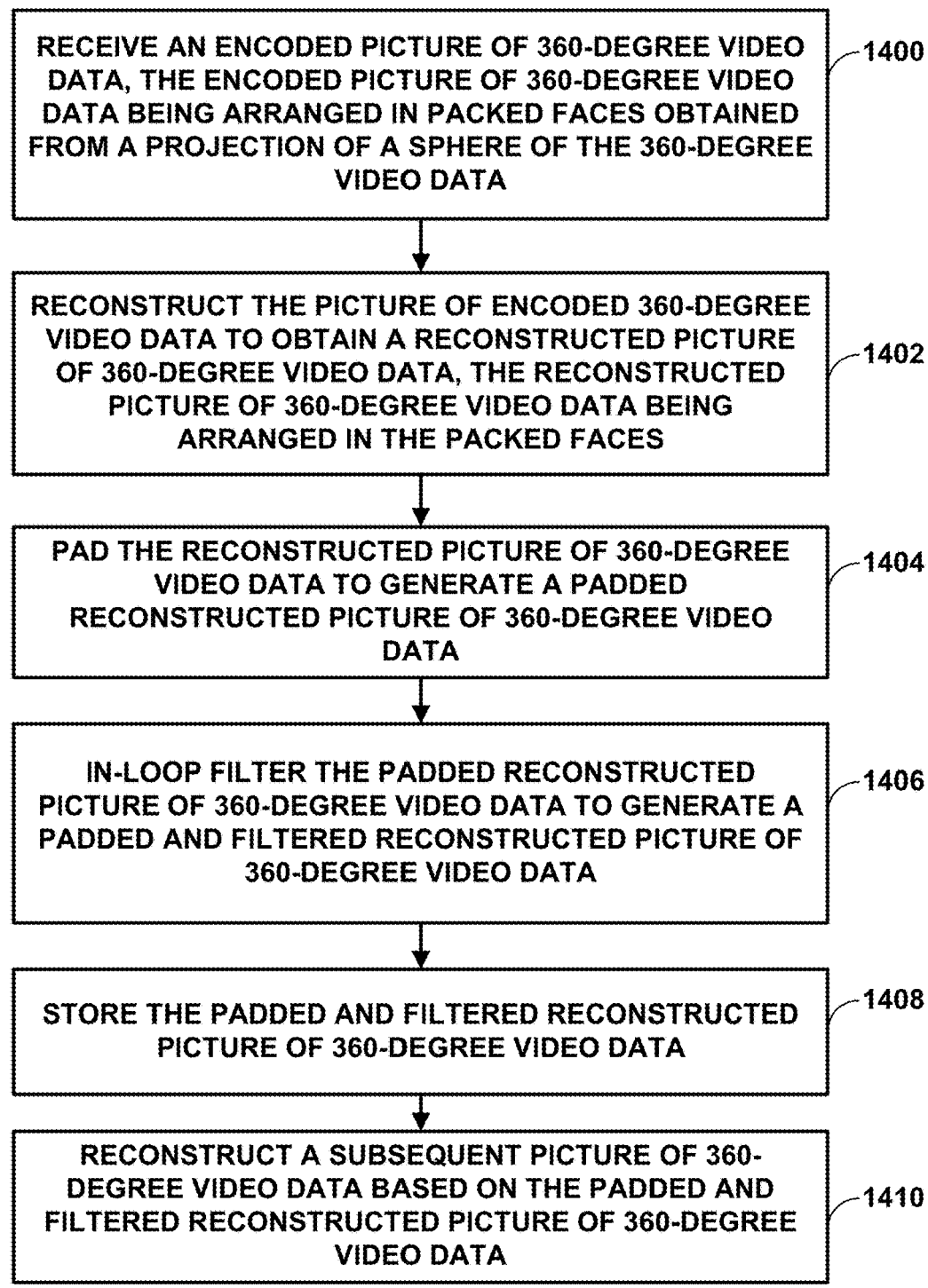
FIG. 14 is a flowchart illustrating an example decoding method of the disclosure.

FIG. 14 is a flowchart illustrating an example decoding method of the disclosure. Video decoder 30, including filter unit 81, may be configured to perform the techniques of FIG. 14.

In one example of the disclosure, video decoder 30 may be configured to receive the encoded picture of 360-degree video data, the encoded picture of 360-degree video data being arranged in packed faces obtained from a projection of a sphere of the 360-degree video data (1400). The packed faces may be obtained from the projection using any of equirectangular projection (ERP), cubemap projection (CMP), adjusted cubemap projection (ACP), equatorial cylindrical projection (ECP), or any other projection technique.

Video decoder 30 may reconstruct the picture of encoded 360-degree video data to obtain a reconstructed picture of 360-degree video data, the reconstructed picture of 360-degree video data being arranged in the packed faces (1402). For instance, inverse quantization unit 76 and inverse transform unit 78 may respectively inverse quantize and inverse transform the quantized coefficients of residual blocks (e.g., obtained from entropy decoding unit 70) to generate reconstructed residual blocks, and summer 80 may add the reconstructed residual blocks to corresponding motion compensated prediction blocks produced by motion compensation unit 72 to produce reconstructed video blocks.

Video decoder 30 may pad the reconstructed picture of 360-degree video data to generate a padded reconstructed picture of 360-degree video data (1404). For instance, padding unit 83 may add additional samples around a projected region (e.g., the packed faces) of the reconstructed picture of 360-degree video data as shown in the examples of FIGS. 5A-5C and 6A-6C.

In some examples, to add the additional samples, padding unit 83 may add the additional samples symmetrically around the packed faces. For instance, in the example of FIGS. 5A, 5C, 6A, and 6C, padding unit 83 may add samples around every face (region outside of dashed lines).

In some examples, to add the additional samples, padding unit 83 may add the additional samples asymmetrically around the packed faces. For instance, in the example of FIGS. 5B and 6B, padding unit 83 may add samples around every face (region outside of dashed lines).

Padding unit 83 may obtain the additional samples in a variety of ways. As one example, padding unit 83 may duplicate boundary samples of the projection region into the padded region. As another example, padding unit 83 may perform a projection process to convert the packed faces into a sphere of 360-degree video data, and obtain the additional samples from the sphere.

Video decoder 30 may in-loop filter the padded reconstructed picture of 360-degree video data (1406), and store the padded and filtered reconstructed picture of 360-degree video data (1408). For instance, filter unit 81 may apply any combination of filters, such as deblocking, SAO, and ALF, to the padded reconstructed picture of 360-degree video data to generate a padded and filtered reconstructed picture of 360-degree video data. Filter unit 81 may store the padded and filtered reconstructed picture of 360-degree video data in reference picture memory 82. In this way, the video decoder 30 may mitigate distortion and coding efficiency issues resulting from deformation and discontinuities at the borders between packed faces.

In some examples, filter unit 81 may filter samples of the padded reconstructed picture of 360-degree video data that are included in the packed faces based on samples of the padded reconstructed picture of 360-degree video data that are included in the packed faces and the added additional samples of the padded reconstructed picture of 360-degree video data. In some of such examples, filter unit 81 may not filter the added additional samples of the padded reconstructed picture of 360-degree video data. In this way, filter unit 81 may restrict the filtering to the packed faces (e.g., the cube faces).

Video decoder 30 may reconstruct a subsequent picture of 360-degree video data based on the padded and filtered reconstructed picture of 360-degree video data (1410). For instance, motion compensation unit 72 may utilize one or more blocks of the padded and filtered reconstructed picture of 360-degree video data as predictor blocks for performing inter prediction.

Video decoder 30, or another renderer, may render viewports of the 360-degree video data. For instance, video decoder 30 may generate a viewport that matches a viewer's head orientation.

In some examples, post processing may be applied. For instance, video decoder 30 may include a post processor configured to apply filtering to reduce or eliminate seam artifacts. For instance, the post processor may identify one or more regions in the rendered viewport that include seams between the packed faces; and apply a filter to the one or more identified regions. As discussed above, in some examples, the filter may include a lowpass filter.

The following numbered examples may illustrate one or more aspects of the disclosure:

Example 1

A method of decoding 360-degree video data, the method comprising: receiving an encoded picture of 360-degree video data, the encoded picture of 360-degree video data being arranged in packed faces obtained from a projection of a sphere of the 360-degree video data; decoding the picture of encoded 360-degree video data to obtain a reconstructed picture of 360-degree video data, the decoded picture of 360-degree video data being arranged in the packed faces; padding the reconstructed picture of 360-degree video data to generate a padded reconstructed picture of 360-degree video data; in-loop filtering the padded reconstructed picture of 360-degree video data to generate a padded and filtered reconstructed picture of 360-degree video data; and storing the padded and filtered reconstructed picture of 360-degree video data in a reference picture memory for use in predicting subsequent pictures of 360-degree video data.

Example 2

The method of example 1, wherein padding the reconstructed picture of 360-degree video data comprises: adding additional samples around a projected region of the reconstructed picture of 360-degree video data.

Example 3

The method of example 2, wherein the projected region of the reconstructed picture of 360-degree video data comprises the packed faces, and wherein adding the additional samples around the projected region comprises adding additional samples symmetrically around the packed faces.

Example 4

The method of example 2, wherein the projected region of the reconstructed picture of 360-degree video data comprises the packed faces, and wherein adding the additional samples around the projected region comprises adding additional samples asymmetrically around the packed faces.

Example 5

The method of any combination of examples 2-4, wherein the additional samples comprise additional projected samples.

Example 6

The method of any combination of examples 2-5, wherein in-loop filtering the padded reconstructed picture of 360-degree video data comprises: filtering samples of the padded reconstructed picture of 360-degree video data that are included in the packed faces based on samples of the padded reconstructed picture of 360-degree video data that are included in the packed faces and the added additional samples of the padded reconstructed picture of 360-degree video data.

Example 7

The method of example 6, wherein in-loop filtering the padded reconstructed picture of 360-degree video data comprises: not filtering the added additional samples of the padded reconstructed picture of 360-degree video data.

Example 8

The method of any combination of examples 1-7, wherein the projection is a cubemap projection of the sphere of the 360-degree video data.

Example 9

The method of any combination of examples 1-8, further comprising: removing the padding from the padded and filtered reconstructed picture of 360-degree video data to generate a filtered reconstructed picture of 360-degree video data.

Example 10

The method of example 9, further comprising: rendering, based on the filtered reconstructed picture of 360-degree video data, a viewport of the 360-degree video data.

Example 11

The method of example 10, wherein rendering the viewport of the 360-degree video data comprises: identifying one or more regions in the rendered viewport that include seams between the packed faces; and applying a filter to the one or more identified regions.

Example 12

A device for decoding 360-degree video data, the device comprising: a memory; and one or more processors that are implemented in circuitry and configured to perform the method of any combination of examples 1-11.

Example 13

A device for decoding 360-degree video data, the device comprising means for performing the method of any combination of examples 1-11.

Example 14

A computer-readable storage medium storing instructions that, when executed, cause one or more processors of a video decoder to perform the method of any combination of examples 1-11.

Example 15

A method of encoding 360-degree video data, the method comprising: obtaining a reconstructed picture of 360-degree video data, the reconstructed picture of 360-degree video data being arranged in packed faces obtained from a projection of a sphere of the 360-degree video data; padding the reconstructed picture of 360-degree video data to generate a padded reconstructed picture of 360-degree video data; in-loop filtering the padded reconstructed picture of 360-degree video data to generate a padded and filtered reconstructed picture of 360-degree video data; and storing the padded and filtered reconstructed picture of 360-degree video data in a reference picture memory for use in predicting subsequent pictures of 360-degree video data.

Example 16

The method of example 15, wherein padding the reconstructed picture of 360-degree video data comprises: adding additional samples around a projected region of the reconstructed picture of 360-degree video data.

Example 17

The method of example 16, wherein in-loop filtering the padded reconstructed picture of 360-degree video data comprises: filtering samples of the padded reconstructed picture of 360-degree video data that are included in the packed faces based on samples of the padded reconstructed picture of 360-degree video data that are included in the packed faces and the added additional samples of the padded reconstructed picture of 360-degree video data.

Example 18

The method of any combination of examples 15-17, further comprising: outputting a coded video bitstream that includes a representation of the 360-degree video data.

Example 19

A device for decoding 360-degree video data, the device comprising: a memory; and one or more processors that are implemented in circuitry and configured to perform the method of any combination of examples 15-18.

Example 20

A device for decoding 360-degree video data, the device comprising means for performing the method of any combination of examples 15-18.

Example 21

A computer-readable storage medium storing instructions that, when executed, cause one or more processors of a video decoder to perform the method of any combination of examples 15-18.

Example 22

Any combination of examples 1-21.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding 360-degree video data, the method comprising:
    receiving an encoded picture of 360-degree video data, the encoded picture of 360-degree video data being arranged in packed faces obtained from a projection of a sphere of the 360-degree video data;
    decoding the picture of encoded 360-degree video data to obtain a reconstructed picture of 360-degree video data, the reconstructed picture of 360-degree video data being arranged in the packed faces;
    adding, prior to a first filtering process, a first set of additional samples around a top side, a bottom side, a left side, and a right side of a projected region of the reconstructed picture of 360-degree video data to generate a first padded reconstructed picture of 360-degree video data;
    in-loop filtering, based on a first filtering process, the first padded reconstructed picture of 360-degree video data to generate a first padded and filtered reconstructed picture of 360-degree video data;
    removing the padding from the first padded and filtered reconstructed picture to generate a first filtered reconstructed picture of 360-degree video data;
    adding, prior to a second filtering process, a second set of additional samples to the first filtered reconstructed picture to generate a second padded reconstructed picture of 360-degree video data;
    in-loop filtering, based on the second filtering process, the second padded reconstructed picture to generate a second padded and filtered reconstructed picture of 360-degree video data; and
    storing the second padded and filtered reconstructed picture of 360-degree video data in a reference picture memory for use in predicting subsequent pictures of 360-degree video data.

2. The method of claim 1, wherein the projected region of the reconstructed picture of 360-degree video data comprises the packed faces, and wherein adding the additional samples around the projected region comprises adding additional samples symmetrically around the packed faces.

3. The method of claim 1, wherein the projected region of the reconstructed picture of 360-degree video data comprises the packed faces, and wherein adding the additional samples around the projected region comprises adding additional samples asymmetrically around the packed faces.

4. The method of claim 1, wherein the additional samples comprise additional projected samples.

5. The method of claim 1, wherein in-loop filtering the first padded reconstructed picture of 360-degree video data comprises:
    filtering samples of the first padded reconstructed picture of 360-degree video data that are included in the packed faces based on samples of the first padded reconstructed picture of 360-degree video data that are included in the packed faces and the added additional samples of the first padded reconstructed picture of 360-degree video data.

6. The method of claim 5, wherein in-loop filtering the first padded reconstructed picture of 360-degree video data comprises:
    not filtering the added additional samples of the first padded reconstructed picture of 360-degree video data.

7. The method of claim 1, wherein the projection is a cubemap projection of the sphere of the 360-degree video data.

8. The method of claim 1, further comprising:
    rendering, based on the second padded and filtered reconstructed picture of 360-degree video data, a viewport of the 360-degree video data.

9. The method of claim 8, wherein rendering the viewport of the 360-degree video data comprises:
    identifying one or more regions in the rendered viewport that include seams between the packed faces; and
    applying a filter to the one or more identified regions.

10. The method of claim 1, further comprising:
    predicting subsequent pictures of 360-degree video data by at least performing motion compensation using the second padded and filtered reconstructed picture of 360-degree video data.

11. A device for decoding 360-degree video data, the device comprising:
    a memory; and
    one or more processors that are implemented in circuitry and configured to:
        obtain, from the coded video bitstream, an encoded picture of 360-degree video data, the encoded picture of 360-degree video data being arranged in packed faces obtained from a projection of a sphere of the 360-degree video data;
        decode the picture of encoded 360-degree video data to obtain a reconstructed picture of 360-degree video data, the reconstructed picture of 360-degree video data being arranged in the packed faces;
        add, prior to a first filtering process, a first set of additional samples around a top side, a bottom side, a left side, and a right side of a projected region of the reconstructed picture of 360-degree video data to generate a first padded reconstructed picture of 360-degree video data;
        in-loop filter, based on a first filtering process, the first padded reconstructed picture of 360-degree video data to generate a first padded and filtered reconstructed picture of 360-degree video data;
        remove the padding from the first padded and filtered reconstructed picture to generate a first filtered reconstructed picture of 360-degree video data;
        add, prior to a second filtering process, a second set of additional samples to the first filtered reconstructed picture to generate a second padded reconstructed picture of 360-degree video data;
        in-loop filter, based on a second filtering process, the second padded reconstructed picture to generate a second padded and filtered reconstructed picture of 360-degree video data; and
        store, in the memory, the second padded and filtered reconstructed picture of 360-degree video data for use in predicting subsequent pictures of 360-degree video data.

12. The device of claim 11, wherein the projected region of the reconstructed picture of 360-degree video data comprises the packed faces, and wherein, to add the additional samples around the projected region, the one or more processors are configured to add additional samples symmetrically around the packed faces.

13. The device of claim 11, wherein the projected region of the reconstructed picture of 360-degree video data comprises the packed faces, and wherein, to add the additional samples around the projected region, the one or more processors are configured to add additional samples asymmetrically around the packed faces.

14. The device of claim 11, wherein the additional samples comprise additional projected samples.

15. The device of claim 11, wherein, to in-loop filter the first padded reconstructed picture of 360-degree video data, the one or more processors are configured to:
 filter samples of the first padded reconstructed picture of 360-degree video data that are included in the packed faces based on samples of the first padded reconstructed picture of 360-degree video data that are included in the packed faces and the added additional samples of the first padded reconstructed picture of 360-degree video data.

16. The device of claim 15, wherein, to in-loop filter the first padded reconstructed picture of 360-degree video data, the one or more processors are configured to:
 not filter the added additional samples of the first padded reconstructed picture of 360-degree video data.

17. The device of claim 11, wherein the projection is a cubemap projection of the sphere of the 360-degree video data.

18. The device of claim 11, wherein the one or more processors are further configured to:
 render, based on the second padded and filtered reconstructed picture of 360-degree video data, a viewport of the 360-degree video data.

19. The device of claim 18, wherein, to render the viewport of the 360-degree video data, the one or more processors are configured to:
 identify one or more regions in the rendered viewport that include seams between the packed faces; and
 apply a filter to the one or more identified regions.

20. A method of encoding 360-degree video data, the method comprising:
 obtaining a reconstructed picture of 360-degree video data, the reconstructed picture of 360-degree video data being arranged in packed faces obtained from a projection of a sphere of the 360-degree video data;
 adding, prior to a first filtering process, a first set of additional samples around a top side, a bottom side, a left side, and a right side of a projected region of the reconstructed picture of 360-degree video data to generate a first padded reconstructed picture of 360-degree video data;
 in-loop filtering, based on the first filtering process, the first padded reconstructed picture of 360-degree video data to generate a first padded and filtered reconstructed picture of 360-degree video data;
 removing the padding from the first padded and filtered reconstructed picture to generate a first filtered reconstructed picture of 360-degree video data;
 adding, prior to a second filtering process, a second set of additional samples to the first filtered reconstructed picture to generate a second padded reconstructed picture of 360-degree video data;
 in-loop filtering, based on the second filtering process, the second padded reconstructed picture to generate a second padded and filtered reconstructed picture of 360-degree video data; and
 storing the second padded and filtered reconstructed picture of 360-degree video data in a reference picture memory for use in predicting subsequent pictures of 360-degree video data.

21. The method of claim 20, wherein in-loop filtering the first padded reconstructed picture of 360-degree video data comprises:
 filtering samples of the first padded reconstructed picture of 360-degree video data that are included in the packed faces based on samples of the first padded reconstructed picture of 360-degree video data that are included in the packed faces and the added additional samples of the first padded reconstructed picture of 360-degree video data.

22. The method of claim 20, further comprising:
 outputting a coded video bitstream that includes a representation of the 360-degree video data.

23. A device for encoding 360-degree video data, the device comprising:
 a memory; and
 one or more processors that are implemented in circuitry and configured to:
  obtain a reconstructed picture of 360-degree video data, the reconstructed picture of 360-degree video data being arranged in packed faces obtained from a projection of a sphere of the 360-degree video data;
  add, prior to a first filtering process, a first set of additional samples around a top side, a bottom side, a left side, and a right side of a projected region of the reconstructed picture of 360-degree video data to generate a first padded reconstructed picture of 360-degree video data;
  in-loop filter, based on the first filtering process, the first padded reconstructed picture of 360-degree video data to generate a first padded and filtered reconstructed picture of 360-degree video data;
  remove the padding from the first padded and filtered reconstructed picture to generate a first filtered reconstructed picture of 360-degree video data;
  add, prior to a second filtering process, a second set of additional samples to the first filtered reconstructed picture to generate a second padded reconstructed picture of 360-degree video data;
  in-loop filter, based on the second filtering process, the second padded reconstructed picture to generate a second padded and filtered reconstructed picture of 360-degree video data; and
  store, in the memory, the second padded and filtered reconstructed picture of 360-degree video data for use in predicting subsequent pictures of 360-degree video data.

24. The device of claim 23, wherein, to in-loop filter the first padded reconstructed picture of 360-degree video data, the one or more processors are configured to:
 filter samples of the first padded reconstructed picture of 360-degree video data that are included in the packed faces based on samples of the first padded reconstructed picture of 360-degree video data that are included in the packed faces and the added additional samples of the first padded reconstructed picture of 360-degree video data.

* * * * *